United States Patent
Kiesel et al.

(10) Patent No.: US 8,437,582 B2
(45) Date of Patent: *May 7, 2013

(54) TRANSMITTING LIGHT WITH LATERAL VARIATION

(75) Inventors: Peter Kiesel, Palo Alto, CA (US); Oliver Schmidt, Aalen (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 953 days.

This patent is subject to a terminal disclaimer.

(21) Appl. No.: 12/409,003

(22) Filed: Mar. 23, 2009

(65) Prior Publication Data

US 2009/0220189 A1    Sep. 3, 2009

Related U.S. Application Data

(63) Continuation-in-part of application No. 11/316,241, filed on Dec. 22, 2005, now Pat. No. 7,522,786.

(51) Int. Cl.
*G02B 6/00* (2006.01)
*G02B 6/12* (2006.01)

(52) U.S. Cl.
USPC ............................................. 385/12; 385/14

(58) Field of Classification Search ...................... 385/12
See application file for complete search history.

(56) References Cited

U.S. PATENT DOCUMENTS

| | | |
|---|---|---|
| 2,708,389 A | 5/1955 | Kavanagh |
| 3,973,118 A | 8/1976 | LaMontagne |
| 4,081,277 A | 3/1978 | Brault et al. |
| 4,455,089 A | 6/1984 | Yeung et al. |
| 4,573,796 A | 3/1986 | Martin et al. |
| 4,764,670 A | 8/1988 | Pace et al. |
| 4,957,371 A | 9/1990 | Pellicori et al. |
| 4,976,542 A | 12/1990 | Smith |

(Continued)

FOREIGN PATENT DOCUMENTS

| | | |
|---|---|---|
| WO | 8905465 | 6/1989 |
| WO | WO 89/05465 A1 | 6/1989 |

(Continued)

OTHER PUBLICATIONS

Office communication in U.S. Appl. No. 11/633,302, mailed Apr. 24, 2009, 17 pages.

(Continued)

*Primary Examiner* — Uyen Chau N Le
*Assistant Examiner* — Kajli Prince
(74) *Attorney, Agent, or Firm* — Hollingsworth Davis, LLC

(57) ABSTRACT

Input light, such as from an optical sensor or stimulus-wavelength converter, includes one or more light or dark sub-bands. The input light is transmitted, such as through a transmissive layer or transmission component, to obtain effects due to transmission with lateral variation. A detector can, for example, obtain spectral information or other photon energy information about the sub-bands due to lateral variation. For each light or dark sub-band, a transmission component can, for example, provide a respective light or dark spot, and spot position can be used to obtain spectral information such as absolute wavelength or wavelength change. A photosensing component can sense or detect transmitted light or output photons, such as with a photosensor array or a position-sensitive detector. Circuitry can use photosensed quantities to obtain, e.g. a differential signal or information about time of wavelength change.

4 Claims, 26 Drawing Sheets

U.S. PATENT DOCUMENTS

| | | |
|---|---|---|
| 5,080,462 A | 1/1992 | Goto |
| 5,136,152 A | 8/1992 | Lee |
| 5,144,498 A | 9/1992 | Vincent |
| 5,151,585 A | 9/1992 | Siebert |
| 5,166,755 A | 11/1992 | Gat |
| 5,170,224 A | 12/1992 | Terada et al. |
| 5,243,614 A | 9/1993 | Wakata et al. |
| 5,305,082 A | 4/1994 | Bret |
| 5,324,401 A | 6/1994 | Yeung et al. |
| 5,414,508 A | 5/1995 | Takahashi et al. |
| 5,572,328 A | 11/1996 | Fouckhardt et al. |
| 5,666,195 A | 9/1997 | Shultz et al. |
| 5,682,038 A | 10/1997 | Hoffman |
| 5,760,391 A * | 6/1998 | Narendran ............... 250/227.14 |
| 5,777,329 A | 7/1998 | Westphal et al. |
| 5,784,507 A | 7/1998 | Holm-Kennedy et al. |
| 5,792,663 A | 8/1998 | Fry et al. |
| 5,793,485 A | 8/1998 | Gourley |
| 5,801,831 A | 9/1998 | Sargoytchev |
| 5,825,792 A | 10/1998 | Villeneuve et al. |
| 5,864,641 A | 1/1999 | Murphy et al. |
| 5,872,655 A | 2/1999 | Seddon et al. |
| 5,876,674 A | 3/1999 | Dosoretz et al. |
| 5,880,474 A | 3/1999 | Norton et al. |
| 5,945,676 A | 8/1999 | Chalil et al. |
| 5,953,138 A | 9/1999 | Ellis |
| 6,034,981 A | 3/2000 | Kim |
| 6,040,578 A | 3/2000 | Malin et al. |
| 6,049,727 A | 4/2000 | Crothall |
| 6,091,502 A | 7/2000 | Weigl et al. |
| 6,108,463 A | 8/2000 | Herron et al. |
| 6,122,536 A | 9/2000 | Sun et al. |
| 6,137,117 A | 10/2000 | Feldstein et al. |
| 6,187,592 B1 | 2/2001 | Gourley |
| 6,192,168 B1 | 2/2001 | Feldstein et al. |
| 6,216,022 B1 | 4/2001 | Tyrrell et al. |
| 6,249,346 B1 | 6/2001 | Chen et al. |
| 6,275,628 B1 | 8/2001 | Jones et al. |
| 6,295,130 B1 | 9/2001 | Sun et al. |
| 6,307,623 B1 | 10/2001 | Papuchon et al. |
| 6,353,475 B1 | 3/2002 | Jensen et al. |
| 6,399,405 B1 | 6/2002 | Chen et al. |
| 6,405,073 B1 | 6/2002 | Crowley et al. |
| 6,429,022 B1 | 8/2002 | Kunz et al. |
| 6,438,397 B1 | 8/2002 | Bosquet et al. |
| 6,456,411 B1 | 9/2002 | Ishikawa et al. |
| 6,459,080 B1 | 10/2002 | Yin et al. |
| 6,483,959 B1 | 11/2002 | Singh et al. |
| 6,490,302 B1 | 12/2002 | Koishi et al. |
| 6,505,775 B1 | 1/2003 | Gu et al. |
| 6,519,037 B2 | 2/2003 | Jung et al. |
| 6,525,308 B1 | 2/2003 | Schmidt-Hattenberger |
| 6,558,945 B1 | 5/2003 | Kao |
| 6,577,780 B2 | 6/2003 | Lockhart |
| 6,580,507 B2 | 6/2003 | Fry et al. |
| 6,594,022 B1 | 7/2003 | Watterson et al. |
| 6,603,548 B2 | 8/2003 | Church et al. |
| 6,608,679 B1 | 8/2003 | Chen et al. |
| 6,621,837 B2 | 9/2003 | Le Gall et al. |
| 6,630,999 B2 | 10/2003 | Shroder |
| 6,639,679 B2 | 10/2003 | Frojdh |
| 6,665,113 B2 | 12/2003 | Aso et al. |
| 6,694,158 B2 | 2/2004 | Polak |
| 6,700,664 B1 | 3/2004 | Honda et al. |
| 6,717,965 B2 | 4/2004 | Hopkins, II et al. |
| 6,763,046 B2 | 7/2004 | Baillargeon et al. |
| 6,781,690 B2 | 8/2004 | Armstrong et al. |
| 6,785,002 B2 | 8/2004 | Zarrabian et al. |
| 6,795,190 B1 | 9/2004 | Paul et al. |
| 6,796,710 B2 | 9/2004 | Yates et al. |
| 6,800,849 B2 | 10/2004 | Staats |
| 6,801,553 B2 | 10/2004 | Imaki et al. |
| 6,809,865 B2 | 10/2004 | Chen |
| 6,839,140 B1 | 1/2005 | O'Keefe et al. |
| 6,867,420 B2 | 3/2005 | Mathies et al. |
| 6,870,149 B2 | 3/2005 | Berezin |
| 6,887,713 B2 | 5/2005 | Nelson et al. |
| 6,924,898 B2 | 8/2005 | Deck |
| 6,930,819 B2 | 8/2005 | Chu et al. |
| 6,952,603 B2 | 10/2005 | Gerber et al. |
| 6,980,297 B2 | 12/2005 | Maeda |
| 7,012,696 B2 | 3/2006 | Orr et al. |
| 7,022,966 B2 | 4/2006 | Gonzo et al. |
| 7,046,357 B2 | 5/2006 | Weinberger et al. |
| 7,057,799 B2 | 6/2006 | Chu |
| 7,064,836 B2 | 6/2006 | Bechtel et al. |
| 7,106,441 B2 | 9/2006 | Sun et al. |
| 7,149,396 B2 | 12/2006 | Schmidt et al. |
| 7,167,239 B2 | 1/2007 | Yamamoto |
| 7,248,361 B2 | 7/2007 | Kiesel et al. |
| 7,268,868 B2 | 9/2007 | Kiesel et al. |
| 7,274,011 B2 | 9/2007 | Tennant et al. |
| 7,291,824 B2 | 11/2007 | Kiesel et al. |
| 7,310,153 B2 | 12/2007 | Kiesel et al. |
| 7,315,667 B2 | 1/2008 | Schmidt et al. |
| 7,358,476 B2 | 4/2008 | Kiesel et al. |
| 7,386,199 B2 | 6/2008 | Schmidt et al. |
| 7,387,892 B2 | 6/2008 | Kiesel et al. |
| 7,420,677 B2 | 9/2008 | Schmidt et al. |
| 7,433,552 B2 | 10/2008 | Kiesel et al. |
| 7,456,953 B2 | 11/2008 | Schmidt et al. |
| 7,471,399 B2 | 12/2008 | Kiesel et al. |
| 7,479,625 B2 | 1/2009 | Kiesel et al. |
| 7,502,123 B2 | 3/2009 | Schmidt et al. |
| 7,522,786 B2 | 4/2009 | Kiesel et al. |
| 7,547,904 B2 | 6/2009 | Schmidt et al. |
| 7,633,629 B2 | 12/2009 | Kiesel et al. |
| 2001/0007501 A1 | 7/2001 | Frojdh |
| 2002/0131047 A1 | 9/2002 | Zarrabian et al. |
| 2002/0155485 A1 | 10/2002 | Kao |
| 2003/0000835 A1 | 1/2003 | Witt et al. |
| 2003/0020915 A1 | 1/2003 | Schueller et al. |
| 2003/0077660 A1 | 4/2003 | Pien et al. |
| 2003/0137672 A1 | 7/2003 | Moriya et al. |
| 2003/0161024 A1 | 8/2003 | Zhang et al. |
| 2003/0189711 A1 | 10/2003 | Orr et al. |
| 2003/0191377 A1 | 10/2003 | Robinson et al. |
| 2003/0235924 A1 | 12/2003 | Adams et al. |
| 2004/0004980 A1 | 1/2004 | Mazed |
| 2004/0027462 A1 | 2/2004 | Hing |
| 2004/0031684 A1 | 2/2004 | Witt |
| 2004/0032584 A1 | 2/2004 | Honda et al. |
| 2004/0038386 A1 | 2/2004 | Zesch et al. |
| 2004/0067167 A1 | 4/2004 | Zhang et al. |
| 2004/0132214 A1 | 7/2004 | Lin et al. |
| 2004/0141884 A1 | 7/2004 | Unno et al. |
| 2004/0145738 A1 | 7/2004 | Sun et al. |
| 2004/0175734 A1 | 9/2004 | Stahler et al. |
| 2004/0223881 A1 | 11/2004 | Cunningham et al. |
| 2004/0228375 A1 | 11/2004 | Ghosh et al. |
| 2004/0248318 A1 | 12/2004 | Weinberger et al. |
| 2005/0041703 A1 | 2/2005 | Momiuchi et al. |
| 2005/0042615 A1 | 2/2005 | Smith et al. |
| 2005/0068526 A1 | 3/2005 | Avrutsky |
| 2005/0084203 A1 | 4/2005 | Kane |
| 2005/0099624 A1 | 5/2005 | Staehr et al. |
| 2005/0128479 A1 | 6/2005 | Gilbert et al. |
| 2005/0162650 A1 | 7/2005 | Yamamoto |
| 2006/0039009 A1 | 2/2006 | Kiesel et al. |
| 2006/0046312 A1 | 3/2006 | Kiesel et al. |
| 2006/0092413 A1 | 5/2006 | Kiesel et al. |
| 2006/0121555 A1 | 6/2006 | Lean et al. |
| 2006/0138313 A1 | 6/2006 | Tennant et al. |
| 2006/0182659 A1 | 8/2006 | Uniu et al. |
| 2006/0193550 A1 | 8/2006 | Wawro et al. |
| 2006/0240573 A1 | 10/2006 | Kao et al. |
| 2006/0268260 A1 | 11/2006 | Liu et al. |
| 2006/0274313 A1 | 12/2006 | Gilbert et al. |
| 2007/0009380 A1 | 1/2007 | Cunningham |
| 2007/0070347 A1 | 3/2007 | Scherer et al. |
| 2007/0076210 A1 | 4/2007 | Kiesel et al. |
| 2007/0116609 A1 | 5/2007 | Baeuerle et al. |
| 2007/0145249 A1 | 6/2007 | Kiesel et al. |
| 2007/0146704 A1 | 6/2007 | Schmidt et al. |
| 2007/0147189 A1 | 6/2007 | Schmidt et al. |
| 2007/0147726 A1 | 6/2007 | Kiesel et al. |
| 2007/0147728 A1 | 6/2007 | Schmidt et al. |

| | | | |
|---|---|---|---|
| 2007/0148760 | A1 | 6/2007 | Klesel et al. |
| 2007/0201025 | A1 | 8/2007 | Greenwald |
| 2008/0128595 | A1 | 6/2008 | Kiesel et al. |
| 2008/0170230 | A1 | 7/2008 | Gerion |
| 2008/0197272 | A1 | 8/2008 | Kiesel et al. |
| 2008/0213814 | A1 | 9/2008 | Gerion et al. |
| 2009/0220189 | A1 | 9/2009 | Kiesel et al. |

FOREIGN PATENT DOCUMENTS

| | | |
|---|---|---|
| WO | WO 95/20144 A1 | 7/1995 |
| WO | WO 99/44042 A2 | 9/1999 |
| WO | WO 02/25269 A2 | 3/2002 |
| WO | WO03/025630 | 3/2003 |
| WO | WO 2004/083820 A2 | 9/2004 |

OTHER PUBLICATIONS

Notice of Allowance and Fee(s) Due in U.S. Appl. No. 11/315,386, mailed Mar. 20, 2009, 8 pages.
Office communication in U.S. Appl. No. 11/316,303, mailed Jan. 26, 2007, 21 pages.
Amendment with Information Disclosure in U.S. Appl. No. 11/316,303, submitted Apr. 26, 2007, 18 pages.
Office communication in U.S. Appl. No. 11/316,303, mailed Aug. 31, 2007, 19 pages.
Amendment After Final Rejection in U.S. Appl. No. 11/316,303, submitted Oct. 4, 2007, 14 pages.
Office communication in U.S. Appl. No. 11/316,303, mailed Oct. 22, 2007, 3 pages.
Office communication in U.S. Appl. No. 11/316,241, mailed Oct. 23, 2007, 28 pages.
Amendment with Request for Continued Examination in U.S. Appl. No. 11/316,303, submitted Nov. 30, 2007, 14 pages.
Office communication in U.S. Appl. No. 11/316,303, mailed Jan. 10, 2008, 10 pages.
Amendment with Information Disclosure in U.S. Appl. No. 11/316,241, submitted Jan. 23, 2008, 20 pages.
Response with Terminal Disclaimer and Information Disclosure in U.S. Appl. No. 11/316,303, submitted Apr. 4, 2008, 4 pages.
Office communication in U.S. Appl. No. 11/316,241, mailed Apr. 16, 2008, 20 pages.
Notice of Allowance and Fee(s) Due in U.S. Appl. No. 11/316,303, mailed May 14, 2008, 20 pages.
Amendment with Information Disclosure in U.S. Appl. No. 11/316,241, submitted Jul. 11, 2008, 18 pages.
Office communication in U.S. Appl. No. 11/633,323, mailed Sep. 3, 2008, 16 pages.
Office communication in U.S. Appl. No. 11/633,302, mailed Sep. 5, 2008, 34 pages.
Supplemental Amendment with Information Disclosure in U.S. Appl. No. 11/316,241, submitted Nov. 17, 2008, 18 pages.
Notice of Allowance and Fee(s) Due in U.S. Appl. No. 11/316,241, mailed Dec. 1, 2008, 17 pages.
Schaefer, P., Willilams, R.D., Davis. G.K., and Ross, R.A., "Accuracy of Position Detection Using a Position-Sensitive Detector". IEEE Transactions on Instrumentation and Measurement, vol. 47, No. 4, Aug. 1998, pp. 914-919.
Henry, J., and Livingstone, J., "Wavelength response of thin-film optical position-sensitive detectors", J. Opt. A: Pure Appl. Opt., vol. 4, 2002, pp. 527-534.
Adams, M.L., Enzelberger, M., Quake, S., and Scherer, A., "Microfluidic integration on detector arrays for absorption and fluorescence micro-spectrometers", Sensors and Actuators, vol. 104, 2003, pp. 25-31.
Amendment with Information Disclosure in U.S. Appl. No. 11/633,302, submitted Dec. 3, 2008, 34 pages.
Amendment with Information Disclosure in U.S. Appl. No. 11/633,323, submitted Dec. 3, 2008, 19 pages.
Response to Interview Summary in U.S. Appl. No. 11/633,302, submitted May 22, 2009, 4 pages.
Amendment in U.S. Appl. No. 10/922,870, submitted Apr. 30, 2007, 15 pages.
Notice of Allowance and Fee(s) due and attached papers in U.S. Appl. No. 11/315,387, mailed Jun. 20, 2007, 23 pages.
Office communication in U.S. Appl. No. 10/922,870, mailed Jul. 26, 2007, 11 pages.
Amendment in U.S. Appl. No. 10/922,870, submitted Sep. 14, 2007, 9 pages.
Amendment with Request for Continued Examination in U.S. Appl. No. 11/315,387, submitted Sep. 18, 2007, 6 pages.
Office communication in U.S. Appl. No. 10/922,870, mailed Sep. 24, 2007, 3 pages.
Notice of Allowance and Fee(s) due and attached papers in U.S. Appl. No. 11/315,992, mailed Oct. 3, 2007, 19 pages.
Amendment in U.S. Appl. No. 10/922,870, submitted Oct. 4, 2007, 9 pages.
Notice of Allowance and Fee(s) due and attached papers in U.S. Appl. No. 11/315,387, mailed Oct. 5, 2007, 7 pages.
Notice of Allowance and Fee(s) due and attached papers in U.S. Appl. No. 10/992,870 mailed Oct. 22, 2007, 7 pages.
Notice of Allowance and Fee(s) due and attached papers in U.S. Appl. No. 11/702,250, mailed Jun. 18, 2008, 11 pages.
Office communication in U.S. Appl. No. 11/315,386, mailed Sep. 26, 2008, 37 pages.
Notice of Allowance and Fee(s) due and attached papers in U.S. Appl. No. 12/098,584, mailed Oct. 6, 2008, 16 pages.
Amendment with Information Disclosure in U.S. Appl. No. 11/315,386, submitted Dec. 23, 2008, 27 pages.
Response to Official Letter in European Patent Application No. 05255106.6, dated May 24, 2010, 7 pages.
Spear, J.D., and Russo, R.E., "Low noise position sensitive detector for optical probe beam deflection measurements", Rev. Sci. Instrum.. vol. 67, No. 7, Jul. 1996, pp. 2481-2484.
Othonos, A., and Kalli, K., "Fiber-Bragg Gratings—Fundamentals and Applications in Telecommunications and Sensing", Artec House, Norwood, MA, 1999, pp. 304-330.
Fuhr, P.L., "Measuring with Light", Sensors Magazine Online, May 2000, 11 pages.
Bernini, R., Campopiano, S., and Zeni, L., "Silicon Micromachined Hollow Optical Waveguides for Sensing Applications", IEEE Jour. on Selected Topics in Quantum Electronics, vol. 8, No. 1, Jan./Feb. 2002, pp. 106-110.
Udd, E., "Good Sense", spie's oemagazine, Aug. 2002, pp. 27-29.
Johnson, S.G., and Joannopoulos, J.D., "Introduction to Photonic Crystals: Bloch's Theorem, Band Diagrams, and Gaps 9But No Defects)", Feb. 3, 2003, pp. 1-16, and attached 49 pages of slides.
Wippich, M., and Dessau, K.L., "Tunable Lasers and Fiber-Bragg-Grating Sensors", The Industrial Physicist, Jun./Jul. 2003, pp. 24-27.
Vollmer, F., Arnold, S., Braun, D., Teraoka, I., and Libchaber, A., "Multiplexed DNA Quantification by Spectroscopic Shift of Two Microsphere Cavities", Biophysical Journal, vol. 85, Sep. 2003, pp. 1-6.
Prasad, P.N., "Introduction to Biophotonics", John Wiley & Sons, Hoboken, N.J., 2003, pp. 311-356.
Singh, K., Liu, C., Capjack, C., Rosmus, W., and Backhouse,.C.J., "Analysis of cellular structure by light scattering measurements in a new cytometer design based on a liquid-core waveguide", IEEE Proc.-Nanobiotechnol., vol. 151, No. 1, Feb. 2004, pp. 10-16.
Sivaprakasam, V., Huston, A., Eversole, J., and Scotto, C., "Multiple UV Wavelength Excitation and Fluorescence of Bioaerosols", 2nd Joint Conference on Point Detection, Williamsburg, VA, 2004, 10 pages.
Cunningham, B.T., Li, P., Schulz, S., Lin, B., Baird, C., Gerstenmaier, J., Genick, C., Wang, F., Fine, E., and Laing, L., "Label-Free Assays on the Bind System", Journal of Biomolecular Screening,vol. 9, No. 6, 2004, pp. 481-490.
Agilant Technologies, "Agilent 83453B High-Resolution Spectrometer—Technical Specifications", Feb. 2005, pp. 1-8.
Shah, M.A., Shanmugan, V., Chowdhury, G.D., and Akkipeddi, R., "Optomechanical design of tunable in P-based Fabry-Perot filters for wavelength division multiplexing applications", J. Microlith., Microfab, Microsyst., vol. 4(4), Oct.-Dec. 2005, pp. 041303-1 through 041303-8.
SRU Biosystems, Inc., "Bind Biosensor TM Technology", Apr. 3, 2004 excerpt, printed from www.srubiosystems.com/tech/index. html on Dec. 8, 2005, 1 page.

FujiKeizai USA, "Biosensor Market, R&D and Commercial Implication", printed from www.fuji-keizai.com/e/report/biosensor2004_e.html on Dec. 21, 2005, 5 pages.

Liu, G.L., and Lee, L.P., "Nanowell surface enhanced Raman scattering arrays fabricated by soft-lithography for label-free biomolecular detections in integrated microfludics", Applied Physics Letters, vol. 87, 2005, pp. 1-3.

Johnson, S.G., "Photonic Crystals: Periodic Surprises in Electromagnetism", printed from ab-initio.mit.edu on Oct. 5, 2006, 3 pages.

Sailor, M.J., "Nanostructured Sensors—'Smart Dust'", printed from www.chem.ucsd.edu on Oct. 5, 2006, 2 pages.

Amendment After Final Rejection in U.S. Appl. No. 11/633,302, submitted Jun. 12, 2009, 32 pages.

Amendment With Request for Continued Examnation in U.S. Appl. No. 11/633,302, submitted Jul. 23, 2009, 31 pages.

Office communication in U.S. Appl. No. 11/633,302, mailed Jul. 23, 2009, 5 pages.

Amendment With Request for Continued Examination in U.S. Appl. No. 11/633,323, submitted Jun. 10, 2009, 24 pages.

Office communication in U.S. Appl. No. 11/633,323, mailed Aug. 13, 2009, 15 pages.

Notice of Allowance and Fee(s) Due in U.S. Appl. No. 11/633,302, mailed Dec. 30, 2009, 11 pages.

Notice of Allowance and Fee(s) Due in U.S. Appl. No. 11/633,323, mailed Dec. 18, 2009, 7 pages.

Amendment in U.S. Appl. No. 11/633,323, submitted Nov. 12, 2009, 35 pages.

EPO Communication in EP Patent Application No. 05 255 106.6-2217, mailed Jan. 18, 2010, 3 pages.

Vidicon Reference dated Dec. 30, 2009, http://en.wikipedia.org/wiki/Video_camera_tube#Vidacon, 1 page.

\* cited by examiner

TRANSMITTING LIGHT WITH LATERAL VARIATION

This application is a continuation-in-part of U.S. Pat. No. 7,522,786, which is hereby incorporated by reference in its entirety.

The following applications, each of which is hereby incorporated by reference in its entirety, might be regarded as related to this application: U.S. Pat. Nos. 7,749,788; 7,547,904; 7,701,590; 7,718,948; 7,502,123; 7,817,276; and 7,554,673.

BACKGROUND OF THE INVENTION

The present invention relates generally to transmission of light, and more particularly to transmitting light with lateral variation.

U.S. Pat. No. 5,166,755 describes a spectrometer apparatus in which a spectrum resolving sensor contains an opto-electronic monolithic array of photosensitive elements and a continuous variable optical filter. The filter can include a variable thickness coating formed into a wedge shape on a substrate or directly on the surface of the array. If polychromatic light passes through the variable filter and is spectrally resolved before incidence on the array, the output of all the elements in the array provides the spectral contents of the polychromatic light. High spectral resolving power is obtained by subtracting the output signals of adjacent elements in the array. Non-imaging applications include measurement of spectral transmission through samples; for molecular absorption and emission spectra; for spectral reflectance measurements; for pollution and emission control by measuring transmission or absorption; for astronomical spectral analyses of stellar radiation; for pyrometry by measuring thermal radiation; and underwater spectrometry.

It would be advantageous to have improved techniques involving transmission of light.

SUMMARY OF THE INVENTION

The invention provides various exemplary embodiments, including systems, methods, and apparatus. In general, the embodiments involve transmission of light with lateral variation.

These and other features and advantages of exemplary embodiments of the invention are described below with reference to the accompanying drawings.

DETAILED DESCRIPTION

Figure 1:
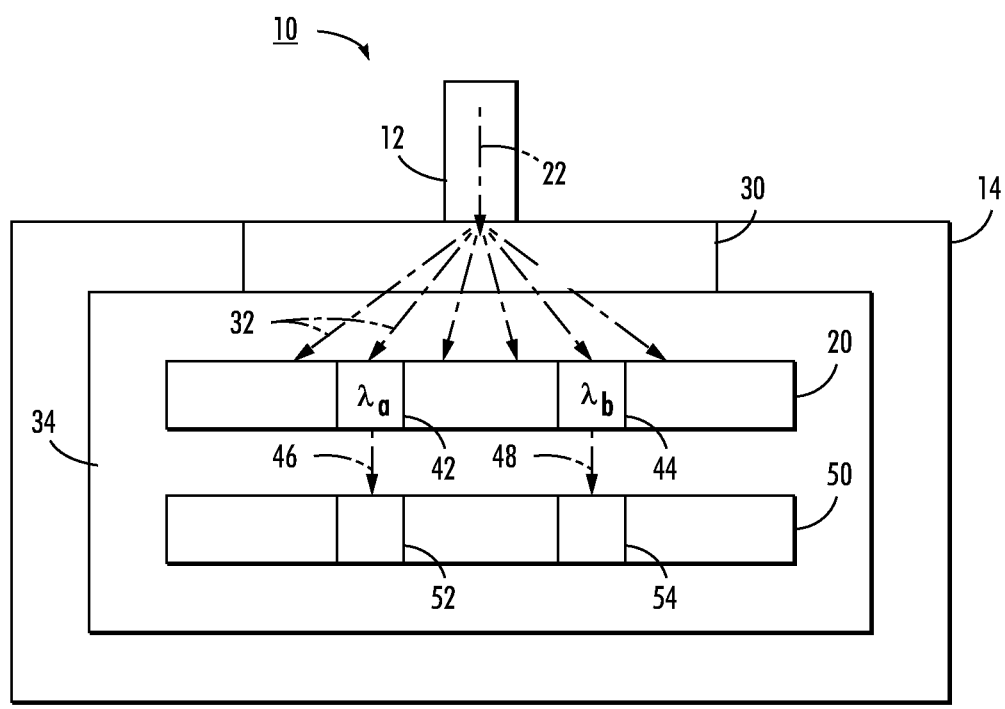
FIG. 1 is a schematic diagram of a system in which a transmission component that transmits light with lateral variation receives input light that includes one or more sub-bands.

In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claims.

Several terms used herein have the meanings set forth in co-pending U.S. Pat. No. 7,701,590, incorporated herein by reference in its entirety, including, for example, "light", "photon", "photon energy distribution", "propagate", "propagated light", "propagating light", "photon energy information", "absolute photon energy information", "relative photon energy information", "wavelength shift", "frequency shift", "photon energy shift", "change", "photosensor", "sensing period", "range of photon energies", "energy range", "throughout", "within", "in", "microfabrication", "support structure", "support surface", "substrate", "up", "over", "above", "down", "under", "below", "upper", "top", "lower", "underlying", "circuitry", "circuit", "processor", "hardware", "software", "integrated circuit", "IC", "structure", and "layered structure".

The term "photon energy" refers herein to the energy of a photon, measured, e.g., as wavelength or frequency. A "spectrum", for example, can indicate intensity for different photon energies within a photon energy distribution; a spectrum can be described, e.g., by indicating an absolute or relative intensity for each of a set of continuous or discrete photon energy values such as wavelengths or wavelength ranges. "Spectral information" is photon energy information indicating intensities for photon energies in a photon energy distribution as a function of photon energy, e.g. wavelength or frequency.

Some exemplary implementations described below address problems that arise in reading out spectral information and other photon energy information such as wavelength or wavelength shift information for light that has photon energy distribution with sub-bands in which intensity is measurably higher or lower than in adjacent photon energies on either side, sometimes referred to herein as "neighboring photon energies". One such problem is the difficulty of obtaining high relative wavelength resolution rapidly and without bulky, expensive equipment; for example, it is difficult to read out information about very small (e.g. in the range between approximately $10^{-4}$ nm to a few nm) wavelength shifts. Another is the difficulty of obtaining high absolute wavelength resolution. It can also be problematic to provide sensitivity to wavelength and not to intensity of incident light.

The term "sensing" is used herein in the most generic sense of obtaining information from a physical stimulus; sensing therefore includes actions such as detecting, measuring, and so forth. To "photosense" is to sense photons, and to "photosense quantity" of photons is to obtain information indicating a quantity of the photons. Photons that are photosensed are sometimes referred to herein as "incident photons".

The term "light spot", as used herein, refers to a distinguishable high intensity region of a pattern of light received by a photosensor or other component that performs photosensing in response to which the photosensor or other component is capable of providing information resulting from the higher intensity region's position, referred to as "light spot position". Similarly, "dark spot" refers herein to a distinguishable low intensity region of a pattern of light received by a photosensor or other component that performs photosensing in response to which it is capable of providing information resulting from the low intensity region's position, referred to herein as a "dark spot position". More generally, a position of a spot, whether light or dark, is sometimes referred to herein simply as "spot position".

The terms "measurable", "measurably", "distinguishable", and "distinguishably", in the context of photosensing applications, all refer to amounts or differences that can be measured or distinguished with photosensors used the application. In other words, an amount is measurable in an application if photosensors used in that application provide information indicating the amount; similarly, two items are distinguishable or "measurably different" in an application if photosensors used in that application provide different values for the two items.

A given spectrum or other distribution of photon energies can be referred to as being in or including a "spectral band" or simply "band", and a specific instance of light could be in or include one or more of several types of bands. Light includes a "sub-band", for example, if, within a subrange of an applicable range of photon energies, the light has intensities that are measurably different from its intensities at photon energies that neighbor the subrange; if light in the sub-band has measurably higher intensities than its intensities at neighboring photon energies, the light includes a "light sub-band", but if it has measurably lower intensities, it includes a "dark sub-band". A sub-band could bear any appropriate relation to the applicable range: for example, at one extreme, a sub-band could include a very small proportion of the applicable range, while, at the other extreme, a sub-band could include half or even more of the applicable range. The term "sub-band sensing" is used herein to refer to operations that obtain information, such as spectral information, about sub-bands using photosensing.

A photosensor that provides electrical signals indicating position, such as of a high-intensity light spot or low-intensity dark spot, is referred to herein as a "position sensor"; position-sensitive detectors (PSDs), as defined below, are examples of position sensors.

In contrast to photosensing, "stimulus-wavelength conversion" refers to a form of sensing that, in response to a stimulus, provides information about the stimulus through photon energies of output light, such as through wavelength or wavelength shift of one or more sub-bands in output light; such information is referred to herein as "wavelength information". The wavelength information can indicate any of various characteristics of the stimulus, such as timing, magnitude, or polarity of a stimulus change, magnitude or polarity of a stable stimulus, and so forth. A "stimulus-wavelength converter" is a sensor that performs stimulus-wavelength conversion.

A "central wavelength", or other "central value", of a sub-band or other photon energy subrange refers herein to a wavelength or other photon energy value about which the sub-band or subrange is approximately centered. In specific instances, light's distribution of photon energies can have or be provided about one or more "peak energy values" in a given application, meaning maximum values of photon energy subranges in which intensity can measurably exceed intensities in nearby subranges; in other specific instances, light's distribution of photon energies can span a range of photon energies within which are one or more "minimal energy values" in a given application, meaning minimum values of photon energy subranges in which intensity can be measurably less than intensities in nearby subranges.

Light can be in or include a "light narrow band" of energies in a given application if it is in or includes a sub-band that is approximately one-tenth or less of the application's energy range, such as at full width half maximum (FWHM). Similarly, light that spans a range can include a "dark narrow band" of energies if it includes a sub-band that is approximately one-tenth or less of the range spanned; light is referred to as "spanning" a range of photon energies if the light has above-minimal light intensity in at least the upper and lower subranges of the range, even though the light might have minimal light intensity in some intermediate subranges. The term "narrow band" is used herein to encompass both light and dark narrow bands; the term "narrow band sensing" refers to operations that obtain information, such as spectral information, about narrow bands using photosensing. The contrasting term "broad band" generally refers to light that has an energy distribution that is more uniform than a light narrow band across a relatively broad energy range and that has above-minimal light intensity in all energy subranges of interest, i.e. does not include any dark sub-bands within the energy range. In general, subranges of interest can extend from a few picometers to several tens of nanometers, depending on the application.

Some stimulus-wavelength converters are examples of components that provide light within a photon energy range with one or more peak energy values or with one or more minimal energy values; in this sense, such a stimulus-wavelength converter is an example of an optical sensor that outputs a sub-band of optical wavelengths, such as when illuminated with a broad band of optical wavelengths or otherwise stimulated. Various other components, however, can also provide photon energy distributions with light or dark sub-bands, as illustrated by some of the exemplary implementations described below; for example, a component may provide light spanning a photon energy range with one or more minimal energy values. Furthermore, some systems may receive input light through a light input component that operates primarily as an aperture, a lens, or a light source, with or without additional parts that affect light provided.

As used herein, a "system" is a combination of two or more parts or components that can perform a function together. A system may be characterized by its function; for example, a "sub-band sensing system" is a system that performs sub-band sensing; a "processing system" is a system that performs data or signal processing; and so forth.

Within a system, components and parts may be referred to in a similar manner. One component of a sub-band sensing system, for example, can be a "light input component" that provides input light to the system; similarly, an "energy information component" obtains information about photon energies, such as spectral information about one or more light and/or dark sub-bands. Similarly, a "transmission component" transmits light; a "photosensing component" performs photosensing; and other examples are defined further below. Other parts or components can be characterized by their structure, such as a "film component", meaning a component that includes one or more films of material.

In the implementations described herein, structures, systems, or parts or components of structures or systems may sometimes be referred to as "attached" to each other or to other structures, systems, parts, or components or vice versa, and operations are performed that "attach" structures, systems, or parts or components of structures or systems to each other or to other things or vice versa; the terms "attached", "attach", and related terms refer to any type of connecting that could be performed in the context. One type of attaching is "mounting", which occurs when a first part or component is attached to a second part or component that functions as a support for the first. In contrast, the more generic term "connecting" includes not only "attaching" and "mounting", but also making other types of connections such as electrical connections between or among devices or components of circuitry. Also, the term "configuring" includes not only "connecting" in any way, but also includes arranging or otherwise positioning components, parts, or devices that may or may not be connected or included in a single structure; parts, components, or devices that together produce a result are therefore sometimes referred to as "configured so that" the result occurs.

Figure 2:
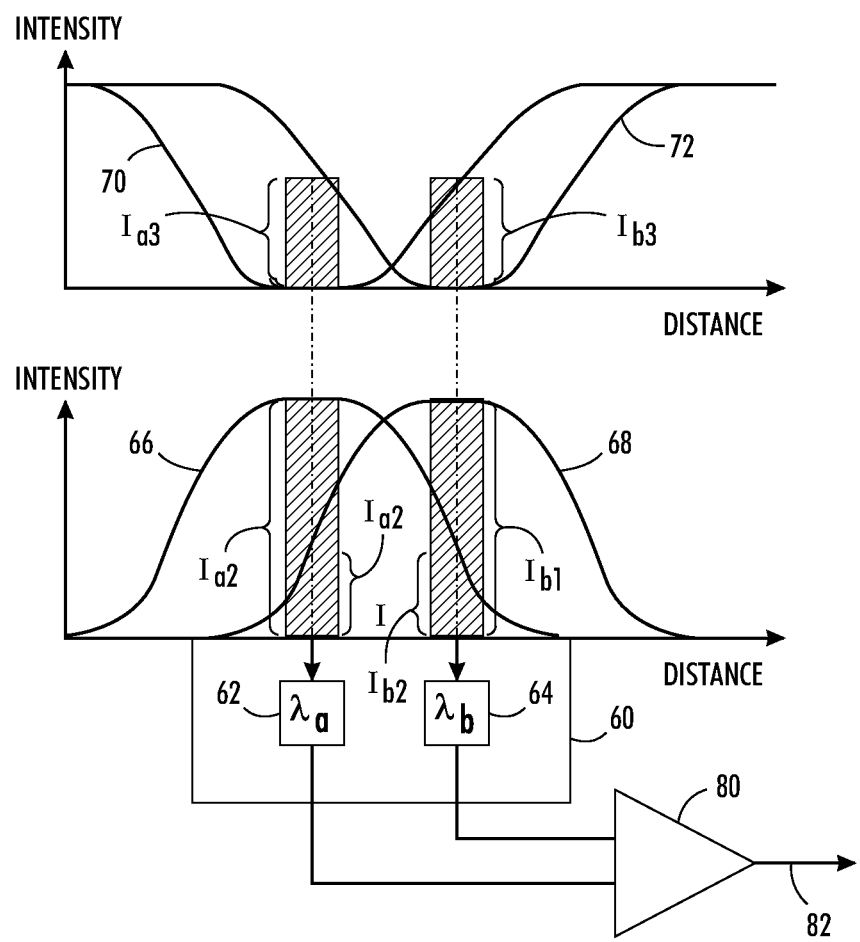
FIG. 2 is a schematic top view of a photosensor array that could receive light transmitted with lateral variation, such as in FIG. 1.

FIGS. 1 and 2 illustrate general features of system 10. Although components of system 10 could be characterized in various ways, the components shown in FIG. 1 include light input component 12 and energy information component 14. Light input component 12 could, for example, be implemented as a stimulus-wavelength conversion device as described in co-pending U.S. Pat. No. 7,522,786 and incorporated herein by reference in its entirety; light input component 12 could also, however, be implemented in a variety of other ways, as described below in relation 5 to exemplary implementations.

In the illustrated implementation, energy information component 14 includes transmission component 20, which includes at least one layer and transmits light with lateral variation; although component 14 might be implemented simply as transmission component 20 with no other optical or electrical components, FIG. 1 illustrates how, in appropriate circumstances, energy information component 14 can also include other features involved in obtaining energy information from a photon energy distribution.

In the illustrated implementation in FIG. 1, component 14 receives input light, represented by ray 22, through propagation component 30, and the input light can include one or more sub-bands. Propagation component 30 propagates the input light to transmission component 20, as suggested by rays 32. Transmission component 20 is illustratively within light sensing assembly 34.

As used herein, a "light propagation component" or simply "propagation component" is any feature, surface, interface, layer, lens, transmission structure as described below, or other component that provides light in response to received light. In general, a light propagation component has an "entry surface", meaning a surface at which it receives entering light, and an "exit surface", meaning a surface at which it provides exiting light. Between its entry and exit surfaces, a propagation component can perform one or more functions on the light, including transmitting, guiding, collimating, imaging, focusing, spreading, and so forth. For example, a propagation component could include one or more optical fibers to transmit input light from component 12 between its entry surface and an assembly of other components at its exit surface.

In the example illustrated in FIG. 1, rays 32 diverge within component 30, suggesting that component 30 spreads input light from component 12, but component 30 could direct the input light in any other appropriate way, as illustrated in greater detail by examples set forth below. As used herein a "light spreading component" or simply "spreading component" is a propagation component for which the exiting light's intensity distribution at any given time has a greater variance in at least one direction than the entering light to which it responds, where variance is expressed as a distance across the respective surface. The exiting light from a spreading component can be described as "spreaded" over a greater extent of the exit surface than the entering light occupies in the entry surface, though the entry and exit surfaces may be closely spaced surfaces in some implementations.

Light sensing assembly 34 receives the input light, such as after spreading by component 30, and, in response, provides electrical signals that indicate information about the stimulus. As implied above, however, transmission component 20 could operate to obtain energy information in other ways, such as without providing electrical signals, e.g. by storing or transmitting the energy information in some other form. Component 20 illustratively transmits light with lateral variation, and could, for example, include a laterally varying transmission structure. A structure that "transmits" photons, sometimes referred to herein as a "transmission structure", is any material structure through which light can propagate. It is not necessary that there be a one-to-one relationship between photons that enter a transmission structure and photons that exit from it as long as the structure provides exiting photons in response to entering photons as a result of light propagation through the structure.

More generally, to "transmit" photons is to perform an operation by which exiting photons at an exit position are provided in response to entering photons at an entry position as a result of light propagation between the entry and exit positions. To "transmit only" a specified set of photons from a first position to a second refers to an operation that transmits photons from the first position to the second, but predominantly photons in the specified set. As with providing photons and photosensing, described above, if a transmission structure transmits only a specified set of photons, between 60-90% of the transmitted photons are in the specified set, but the percentage could be lower or higher. In some applications, 90% or even 95% or more of the photons are in the specified set.

One type of transmission structure is a "coating", meaning a layered structure of light-transmissive material that is on or over another component such as a photosensor array or position sensor or a support structure that is on a photosensor array or position sensor. Various examples of coatings are described below.

A transmission structure can be characterized by an "energy transmission function" or simply "transmission function" that relates positions in the transmission structure to photon energies that are transmitted at the positions. For example, if a position transmits photons within a specific subrange but not outside the specific subrange, the transmission function at that position passes the specific subrange but not other subranges.

A transmission structure is "laterally varying" or has a "laterally varying transmission function" or "laterally varying transmission properties" if its transmission function varies as a function of position within its exit surface, such position being referred to herein as "lateral position". The variation in transmission function can, for example, vary according to a gradient, which can be a "constant transmission gradient" if it varies continuously or uniformly in a lateral direction or a "step-like transmission gradient" if it varies in a step-like manner in a lateral direction. Where a transmission structure is two-dimensional, it could have a constant transmission gradient in one lateral direction and a step-like transmission gradient in another. In contrast, a transmission function that does not vary laterally may be referred to as "homogeneous", and a "homogeneous transmission structure" has a homogeneous transmission function.

More generally, light is described herein as transmitted "with lateral variation" when, in response to input light, transmitted light or output light varies with lateral position as a function of photon energy, and the variation with lateral position was not present in the input light. For example, a laterally varying transmission structure can transmit light with lateral variation, as described below in relation to several exemplary implementations. Light can also be transmitted with lateral variation in other ways; for example, some techniques make it possible for a homogeneous transmission structure to transmit light with lateral variation, including techniques in which light is received across a range of incident angles, as mentioned below.

A transmission structure in component 20 could, for example, transmit light with lateral variation. This feature is illustrated in FIG. 1 by regions 42 and 44. As shown, region 42 transmits a sub-band of light in a subrange centered about wavelength $\lambda_a$. Similarly, region 44 transmits a sub-band of light in a subrange centered about wavelength $\lambda_b$. As a result, the light from regions 42 and 44, represented respectively by rays 46 and 48, is incident on photosensing component 50 at different positions, represented respectively by position 52 and position 54. Therefore, if a change in light input component 12, such as change in a stimulus, causes a change in sub-band photon energy between $\lambda_a$ and $\lambda_b$, this change will be indicated by a change in the light detected at positions 52 and 54. For example, in some of the exemplary implementations below, "change over time" occurs, meaning that the change can be represented by different values at different times, such as in a graph in which the change appears as a function of time. More generally, a difference between intensity of incident light at wavelengths $\lambda_a$ and $\lambda_b$ can be indicated by a difference in light detected at positions 52 and 54.

FIG. 1 therefore illustrates the possible importance of spreading light to be sensed by assembly 34: If input light from component 12 were not incident over a large area of the entry surface of the transmission structure, but were instead incident only on a small area, the light would only reach a corresponding small area of photosensing component 50. In this case, the wavelength information or other spectral information that would otherwise be sensed in other areas of photosensing component 50 would be lost. In this case, spreading enables photosensing component 50 to provide signals that accurately indicate wavelength information from the input light. In other cases, with sufficiently divergent input light, spreading might not be necessary.

As described in greater detail below, a system such as system 10 can be structured so that one or more photosensor arrays, discrete photosensors, or position-sensitive detectors receive light from a region of the exit surface of transmission component 20 for a light or dark sub-band of interest in input light from component 12. More generally, input light component 12 could include any of a variety of structures, light sources or other structures or devices, including, for example, light sources that are pulsed or emit continuously, with the emitted light being collimated or divergent; narrow Bragg mirrors or other such components, with input light from a component being transmitted across a range that includes a dark sub-band and/or reflected in a light sub-band; and optical cavities, with input light from a cavity being, e.g., in transmission modes that are light sub-bands and/or in reflection modes that are broad and include dark sub-bands between them.

Several examples of light sources and of ways of providing light spots on a photosensing component are described in co-pending U.S. Pat. No. 7,701,590 and in U.S. Pat. No. 5,471,399, both incorporated herein by reference in their entireties.

Photosensing component 50 could be implemented in many ways, including with various ICs that include photosensor arrays, discrete photosensing devices, or position sensors. FIG. 2 shows array 60, an example of a photosensor array that could be used to implement photosensing component 50.

Array 60 in FIG. 2 includes cells 62 and 64, labeled to show that cell 62 is at position 52 in FIG. 1, and therefore receives predominantly light in a subrange around wavelength $\lambda_a$, while cell 64 is at position 54 and receives predominantly light in a subrange around wavelength $\lambda_b$. Input light from component 12 could, for example, have or be provided about one or more "peak energy values" in a given application, meaning central values of photon energy subranges in which intensity can measurably exceed intensities in nearby subranges, or about one or more "minimal energy values", meaning control values of photon energy subranges in which intensity can be measurably less than in nearby subranges. If the input light has two peak or minimal energy values $\lambda_a$ and $\lambda_b$ for two respective values of a stimulus, for example, then a change between the stimulus values would result in a wavelength shift between $\lambda_a$ and $\lambda_b$, resulting in a change in quantities of photons sensed by cells 62 and 64. Similarly, if the input light is approximately stable in a narrow band or other sub-band close to $\lambda_a$ and $\lambda_b$, time variation in photon energy would result in change in sensed photon quantities whether transient or oscillating. Furthermore, even if input light is predominantly in a sub-band and is stable with no measurable photon energy time variation, difference between sensed photon quantities could, for example, indicate relation between intensity in the sub-band and intensities in nearby subranges.

More generally, a wavelength shift between wavelengths $\lambda_a$ and $\lambda_b$ or another change in photon energy distribution at the entry surface of transmission structure 40 can change "relative quantities" of photons provided at positions 52 and 54, meaning that the quantities provided at the two positions have a different relation to each other after the change than they did before it. For example, the quantities could increase or decrease, but by amounts such that the quantity at one position becomes a larger or smaller fraction of the quantity at the other position; the quantity at one position could change from being less than the quantity at the other position to being greater; or one quantity could increase while the other decreases; etc. All of these types of changes could occur over time.

The lower graph in FIG. 2 shows the relationship between light intensity and position across array 60 in response to two different incident light patterns with light sub-bands having peak energy values. The first pattern, with peak energy value $\lambda_a$, results in a light spot on array 60 that has an intensity distribution represented by curve 66; the second distribution, with a peak energy $\lambda_b$, similarly results in a light spot with an intensity distribution represented by curve 68. As will be understood, the first light spot, represented by curve 66, may follow a continuous series of positions until it reaches the position of the second light spot, represented by curve 68, such as if a light narrow band of input light makes a continuous transition from $\lambda_a$ to $\lambda_b$ rather than a discrete transition or jump.

The upper graph in FIG. 2 similarly shows relationship between light intensity and position across array 60 in response to two patterns of input light that have different dark sub-bands. The first pattern in which the dark sub-band has a minimal energy value $\lambda_a$, results in a dark spot on array 60 that has an intensity distribution represented by curve 70; the second pattern, with a minimal energy value $\lambda_b$, similarly results in a dark spot with an intensity distribution represented by curve 72. As described above, the first dark spot, represented by curve 70, may follow a continuous series of positions until it reaches the position of the second dark spot, represented by curve 72, such as if wavelength makes a continuous transition rather than a discrete transition or jump.

The graphs also show quantities of photons sensed by cells 62 and 64 in response to the first and second spots, whether light or dark. When the first light spot is provided on array 60, cell 62 senses a quantity proportional to $I_{a1}$, and cell 64 senses a quantity proportional to $I_{b1}$; when the second light spot is on array 60, on the other hand, cell 62 senses a quantity proportional to $I_{a2}$, and cell 64 senses a quantity proportional to $I_{b2}$. Similarly, when the first dark spot is provided, cell 62 senses approximately zero and cell 64 senses a quantity proportional to $I_{b3}$; when the second dark spot is on array 60, on the other hand, cell 62 senses a quantity proportional to $I_{a3}$, and cell 64 senses approximately zero. Accordingly, the relative quantities sensed by cells 62 and 64 change.

The graphs in FIG. 2 show that, due to laterally varying transmission of light in a configuration as in FIG. 1, output light and/or sensing results are affected in certain ways. In the specific example shown, relative quantities of photons provided at two positions, i.e. to cells 62 and 64, would change in response to change between sub-bands, but various other effects could result, some examples of which are described herein. In general, such an effect is described herein as "due to transmission of light with lateral variation", meaning that the effect results at least in part from the lateral variation.

Techniques as described in co-pending U.S. Pat. No. 7,701,590 and incorporated herein by reference in its entirety, can be used to obtain information from the change such as a change of ratio from greater than unity to less than unity or vice versa, a change from a positive difference to a negative difference or vice versa, or a change in the cell that has the highest or lowest sensed quantity; lock-in techniques to increase spot position precision could also be used, similar to those described in co-pending U.S. Pat. No. 7,817,281 and incorporated herein by reference in its entirety. In a more sophisticated approach, a peak or minimal intensity position of a light or dark spot, respectively, could obtain the closest fit of a given set of sensed quantities to a Gaussian curve and could then use the maximum or minimum of the Gaussian curve as the light or dark spot's position. Other techniques could compare sensed quantities from cells of an array with a threshold to select a subset of higher or lower intensity cells; sensed quantities from the selected subset could then be compared to find those of highest or lowest intensity, whose positions could be interpolated to find a position of the light or dark spot. Situations with more than one maximum or minimum could be detected by comparing distance between cells of maximum or minimum intensity with a threshold; if available, software could be used to follow multiple spots across a photosensor array where the maxima or minima are sufficiently separated.

In the particular examples illustrated in FIG. 2, another approach is available: Rather than obtaining a light or dark spot's position or centroid, a shift in spot position can be directly detected, providing a differential quantity resulting from positions of the spot but without a separate calculation of spot position. For example, if a quantity sensed by cell 62 is compared with a quantity sensed by cell 64 and a transition occurs such that one begins greater than the other but becomes less than the other, this indicates a shift, such as from a position indicated by curve 66 to a position indicated by curve 68, or vice versa, or a shift from a position indicated by curve 70 to a position indicated by curve 72, or vice versa. This is an example of how it may be easier to detect a shift in photon energy than it is to detect an absolute value of photon energy. This technique could be extended to multiple spots that are sufficiently separated by using a respective pair of cells for each of the spots.

FIG. 2 also shows how the quantities of photons sensed by cells 62 and 64 can be compared, such as by comparator 80. Comparator 80 could, for example, be biased so that the output signal on line 82 indicates a difference between light incident on cells 62 and 64, such as due to a light spot boundary or a change in photon energy distribution of input light, e.g., from a stimulus change that causes a wavelength shift between wavelengths $\lambda_a$ and $\lambda_b$.

As used herein, an operation or a component of circuitry "compares" if the result indicates a relationship between or among two or more signals or values being compared, such as difference, equality, which is greater, which is less, whether the difference is greater or less than a quantity or meets some other criterion, and so forth.

If it indicates the difference between the photosensed quantities of cells 62 and 64, the value of the output signal on line 72 would be an example of a "differential quantity", which refers herein to a value that indicates difference between or among two or more quantities. A differential quantity could, for example, be an unbiased or biased analog output value from a differential amplifier or other analog comparator; a simple difference obtained by subtraction of two digital values, one or both of which could be normalized or otherwise adjusted; a ratio obtained by analog or digital circuitry; a value obtained by combining related differential quantities, such as differences between each of two or more quantities and a third quantity such as a mean; or any other analog or digital value that includes information about difference. To obtain a differential quantity from more than two quantities, for example, the quantities could be grouped into two groups; the quantities in each group could be combined, such as by summing and, if necessary, by weighting to compensate for different group sizes; and then the combined quantities could be directly compared. A "differential signal" generally refers herein to a signal that indicates a differential quantity. More generally, a "differential output" refers herein to a set of one or more signals that provides information of any kind about a difference between or among two or more quantities, including, for example, magnitude, sign, or change.

Although represented in FIG. 1 simply as a box, component 12 could be implemented in numerous ways to provide input light with one or more light or dark sub-bands, e.g. narrow bands, in its photon energy range. For example, various stimulus-wavelength converters could be used, including Fiber Bragg Gratings (FBGs), plastic optical fibers (POFs), photonic crystals, optical cavity sensors, and various optical biosensors. As described in greater detail below, however, the design of component 14 is affected by properties of input light from component 12, such as whether it is monochromatic or broad spectrum and whether it is parallel or divergent. Other factors affecting the design of component 14 include wavelength resolution and energy range.

If component 14 includes a converter with a single fiber with a single FBG, the input light will be point-like and monochromatic, with a single light narrow band of photon energies. For this type of sensor, propagation component 30 can spread the input light over the whole area of a laterally varying transmission structure in transmission component 20, so that the position of the transmitted light spot on photosensing component 50 corresponds with the wavelength of the input light. Photosensing component 50 could be implemented as a one-dimensional photosensor array with a coating as described below. In addition, photosensing component 50 could alternatively be implemented as a position sensor, as described in U.S. Pat. No. 7,310,153, incorporated herein by reference in its entirety.

If component 14 includes a converter with a single fiber with multiple FBGs, it can provide point-like input light with multiple photon energies such as multiple light narrow bands. As in the previous example, propagation component 30 can spread the input light over the entire area of a laterally varying transmission structure, and photosensing component 50 can be implemented with an array like photosensor array 60, with each cell sensitive to a respective energy subrange. More specifically, photosensing component 50 can be implemented with a one-dimensional photosensor array with a coating as described below.

If component 14 includes a converter with a fiber bundle with a single FBG in each individual fiber, the input light will include several monochromatic point-like inputs, each with a respective light narrow band. Propagation component 30 can spread the light from each point-like input over a respective region of a laterally varying transmission structure. Crosstalk between the different light inputs can be minimized by special optics or blades as described below. For each region of the transmission structure, photosensing component 50 can include a respective set of sensing locations. Photosensing component 50 could be implemented, for example, as a two-dimensional photosensor array with a coating as described below. Alternatively, a coated position sensor array could be used, containing a number of position sensor elements as described in U.S. Pat. No. 7,310,153, incorporated herein by reference in its entirety. These techniques may also be appropriate for a converter that provides a single point-like input with a very large photon energy range within which are one or more dark narrow bands.

If component 14 includes a converter with a fiber bundle with multiple FBGs per fiber, the input light will include several point-like inputs, each with multiple photon energies such as multiple light narrow bands. Propagation component 30 can spread the light from each input over a laterally varying transmission structure such that one respective row of a photosensor array within component 50 receives the light from each input. Photosensing component 50 could be implemented as a two-dimensional photosensor array or CCD IC with a coating as described below. Cross-talk between the different light inputs can be minimized by special optics or blades as described below. These techniques may also be appropriate for a converter that provides a single point-like input with a very large photon energy range within which are one or more dark narrow bands.

Component 12 can provide input light in various ways other than by fiber end facets and point-like sources. As described below, for example, input light can be provided through a broad area source other than a fiber end facet, where the term "broad area source" means a source that has sufficient two-dimensional extent that it cannot be approximated by a single point-like source. Techniques as described below could be applied, for example, to a broad area source that provides substantially the same photon energy distribution throughout its area. In some techniques, a broad area source could be attached directly to light sensing assembly 34.

Photosensing component 50 can include various photosensitive elements, chosen to be appropriate for the incident light intensity. For low power incident light, exemplary solutions include: (1) a small detector surface area, which is beneficial because the total light is not distributed over a large area and the intensity per unit area stays high—this solution is also inexpensive, but, due to a limited detector size, the wavelength range and resolution may also be limited; (2) arrays such as cooled CCDs, avalanche photodiodes, and photomultiplier tubes (PMTs) that provide increased signal-to-noise ratio but are expensive; or (3) intensified CCD arrays that enable single photon counting but are very expensive. For high power incident light, intensity is not critical; therefore, in addition to any of the above exemplary solutions, it may be possible to use inexpensive and simple position-sensitive detectors (PSDs) or photodetector arrays such as avalanche photodiode (APD) arrays, possibly even simple double or quad pin or APD detectors. As used herein, an IC is or includes a "position-sensitive detector" or "PSD" if it includes a substantially continuous photosensitive surface and it provides electrical signals indicating a position resulting from a pattern of incident light on the photosensitive surface. For example, the signals could be two currents whose normalized difference is proportional to a centroid of the incident light pattern.

Photosensing components can obtain sensing results that provide information about position of light or dark spots resulting from light or dark narrow bands in various ways, including providing position-based output currents from a PSD, integrating currents or accumulating free charge carriers in cells at different positions of an array or in discrete detectors at different positions, and various other techniques, some of which are described below. In each case, the sensing results can be read out with appropriate techniques. While the output currents of a PSD or photodiode may in many cases be read out continuously, sensing results from cells of an array are typically read out after sensing periods, such as with CCD or CMOS techniques. In such arrays, each cell's sensing period typically begins with an appropriate initialization operation, and each cell's sensing period ends by the time the cell's sensing result is read out, in some cases ending when readout occurs. The beginnings and endings of sensing periods are typically controlled by signals provided through array circuitry: It is therefore possible to sample at an appropriate rate, such as when light is received continuously; it is also possible to synchronize sensing periods with incident light, such as when light is received from a pulsed laser. If necessary, it is also possible to use similar circuitry for readout of PSDs or photodiodes.

Figure 3:
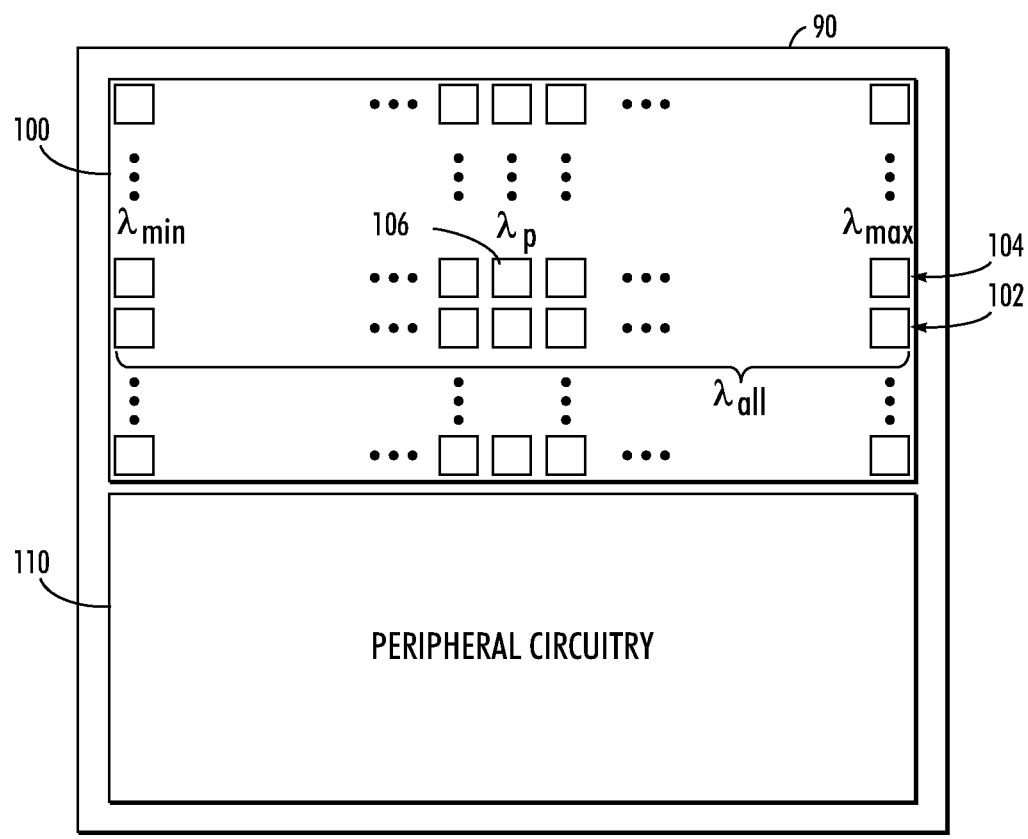
FIG. 3 is a schematic plan view of an integrated circuit (IC) with a photosensor array that could implement an array as in FIG. 2.

Light sensing assembly 34 in FIG. 1 can therefore be implemented in a wide variety of ways, including with various types of photosensor arrays, discrete photosensors, and PSDs. FIG. 3 is a schematic view of an exemplary IC with a photosensor array that can be used in some such implementations. FIGS. 4-11 illustrate various implementations of assembly 34 that can include an IC like that shown in FIG. 3, or that could alternatively be implemented with PSDs as described in U.S. Pat. No. 7,310,153, incorporated herein by reference in its entirety.

IC 90 in FIG. 3 includes photosensor array 100, which is illustratively a two-dimensional array, with at least two rows of cells that include photosensors. Different rows or other parts of array 100 can be provided with different coatings or can be otherwise structured so that their cells photosense different ranges or subranges of photon energies. As a result, the information obtained from a single IC can provide a detailed analysis of incident photons over a broad range of photon energies. In addition, reference cells, such as the cells in row 102, can be used to provide a spatially resolved real-time reference signal, allowing for correction of inhomogeneities, for example. In general, a two-dimensional array as in FIG. 3 could be designed so that different photon energy subranges are photosensed at respective different positions in one dimension, while spatial information is detected in the other dimension, an approach which could be useful, e.g., for parallel readout of a row of fiber Bragg grating (FBG) sensors or surface Plasmon resonance (SPR) sensors with high spectral and spatial resolution.

Within an array, a "pair" of cells is any two cells; unless otherwise specified, the cells in a pair need not have any other specific relationship to each other. The cells in a pair are "near each other" if the distance between them meets a suitable criterion for nearness, such as being no greater than ten times the maximum diameter of the larger of the cells. In general, for example, two cells that are adjacent are also near each other. More generally, a set of cells are all "nearby" another cell if each cell in the set and the other cell, taken as a pair, are near each other. A feature of array 100 is that it includes one or more reference cells that are nearby to a subrange cell, such as by being adjacent to the subrange cell.

Each cell in row 102 photosenses photons throughout a suitable range, characterized as $\lambda_{all}$, to produce a reference for a nearby cell in row 104. For implementations in which it is advantageous to have signal strengths of the same order from a cell in row 102 and its paired cell in row 104, the cell in row 102 must be different from the cells in row 104. For example, it could have a different sensing area or it could have a gray filter coating different than a coating over the paired cell in row 104.

Each cell in row 104, on the other hand, photosenses a respective subrange between $\lambda_{min}$ and $\lambda_{max}$, with illustrative cell 106 photosensing a subrange centered around $\lambda_p$. IC 90 also includes array circuitry (not shown) as well as peripheral circuitry 110 which perform various functions relating to readout of photosensed information from array 100.

One advantage of the technique illustrated in FIG. 3 is that IC 90 provides a compact photosensor array that can be used within a device. Results from more than one such IC within a device may be combined to obtain more complete sensing. In general, photosensed quantities or other results of photosensing are "combined" when they are included together in any data structure or signal, possibly after one or more data processing or signal processing operations.

FIGS. 4-11 illustrate ways to implement assembly 34, and are described in greater detail, together with variations and alternatives, in co-pending U.S. Pat. Nos. 7,522,786 and 7,701,590, both of which are incorporated herein by reference in their entireties. Several figures show fragment 150 of a photosensor array, with cells 152 of the fragment 150 shown schematically in cross-section. Cells 152 receive light that has been transmitted with lateral variation due to variation in optical thickness of a transmission structure; light could also be transmitted with lateral variation due to being received at a transmission structure's entry surface across a range of incident angles, as illustrated and described in relation to FIG. 17 of U.S. Pat. No. 7,701,590. Other techniques for producing transmission structures that could transmit light with lateral variation are described in co-pending U.S. Pat. No. 7,701,580 and incorporated herein by reference in its entirety.

As will be understood from the above definitions of "light spot" and "dark spot", the photon energy distribution received by a transmission structure the manner in which it transmits light with lateral variation together determine whether one or more light or dark spots are produced on fragment 150 of the photosensor array. For example, if the received photon energy distribution includes a light or dark narrow band or other sub-band with an appropriately sized subrange of photon energies that are distinguishable from intensities in neighboring subranges, a light spot or a dark spot will be produced on certain cells 152. As a result, photosensed quantities from the cells can be used to obtain sensing results that depend on light or dark spot position. More generally, the received photon energy distribution and the lateral variation in transmission together determine whether sensing results that depend on position can be obtained, possibly even in situations in which a light or dark spot as defined above may not occur.

Figure 4:
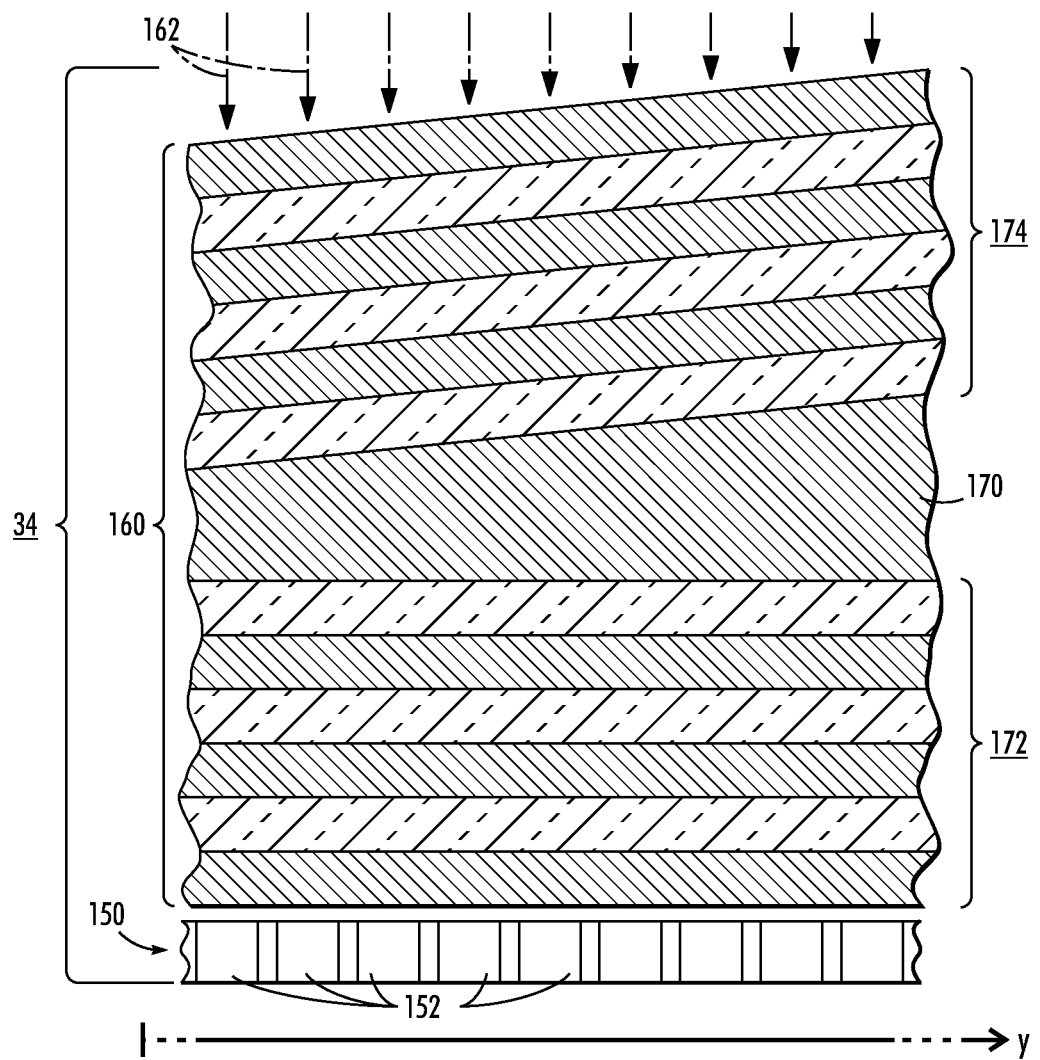
FIG. 4 is a schematic cross-sectional view of an implementation of a transmission structure that can be used in a system such as in FIG. 1.
Figure 5:
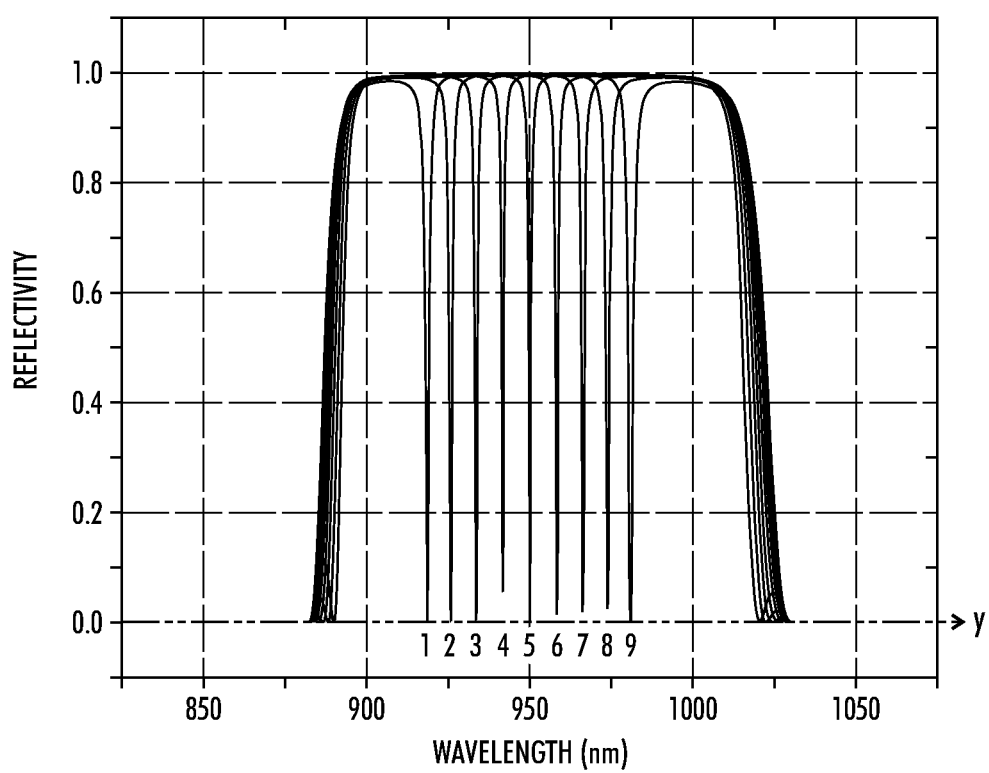
FIG. 5 is a graph illustrating laterally varying light transmission properties of a transmission structure as in FIG. 4.

FIG. 4 shows transmission structure 160 receiving incident light 162. In transmission structure 160, wedge-shaped transmissive cavity 170 is between reflective films 172 and 174 and, because its thickness varies, has laterally varying transmission properties, one example of how light can be transmitted with lateral variation. FIG. 5 illustrates the laterally varying light transmission properties of transmission structure 160.

Figure 6:
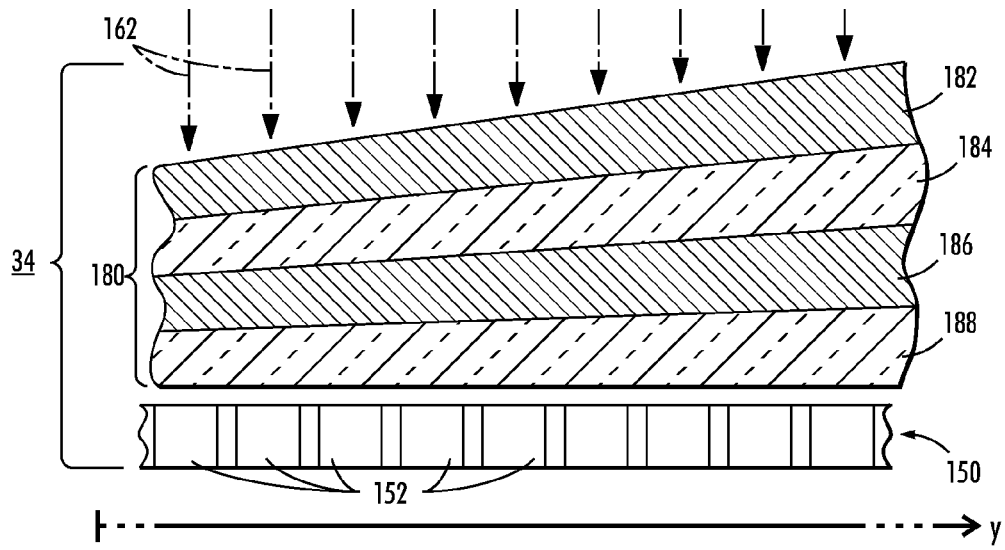
FIG. 6 is a schematic cross-sectional view of another implementation of a transmission structure that can be used in a system such as in FIG. 1.
Figure 7:
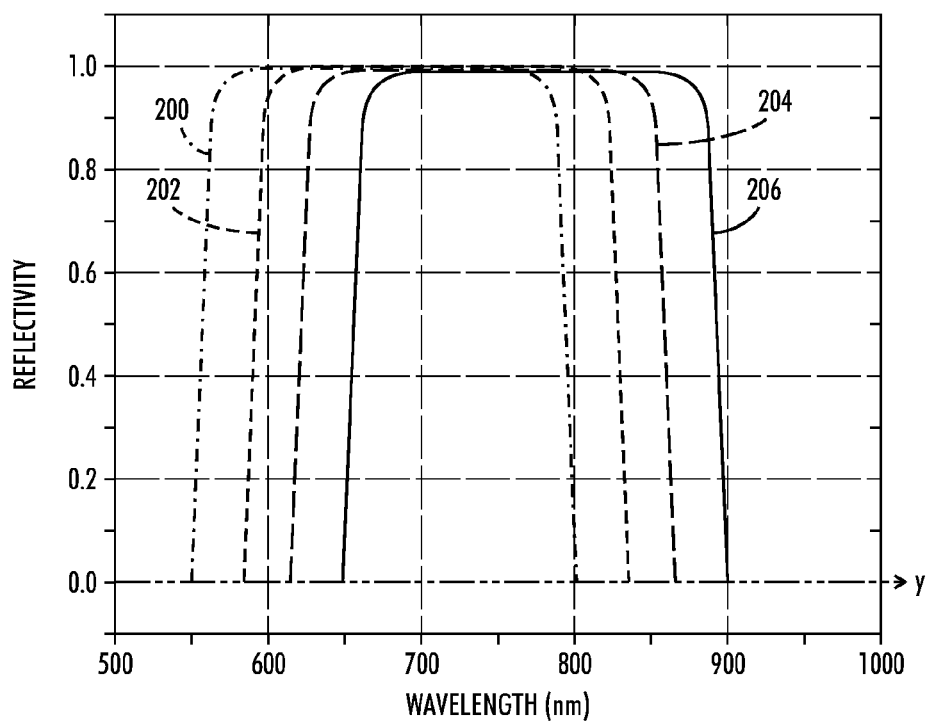
FIG. 7 is a graph illustrating the laterally varying light transmission properties of a transmission structure in FIG. 6.

FIG. 6 shows transmission structure 180, a laterally graded Bragg mirror in which each of layers 182, 184, 186, and 188 is laterally graded, another example of how light can be transmitted with lateral variation. FIG. 7 illustrates the laterally varying light transmission properties of transmission structure 180, with curves 200, 202, 204, and 206 representing reflectivity of the portion of transmission structure 180 over each of four cells 152 in fragment 150.

Figure 8:
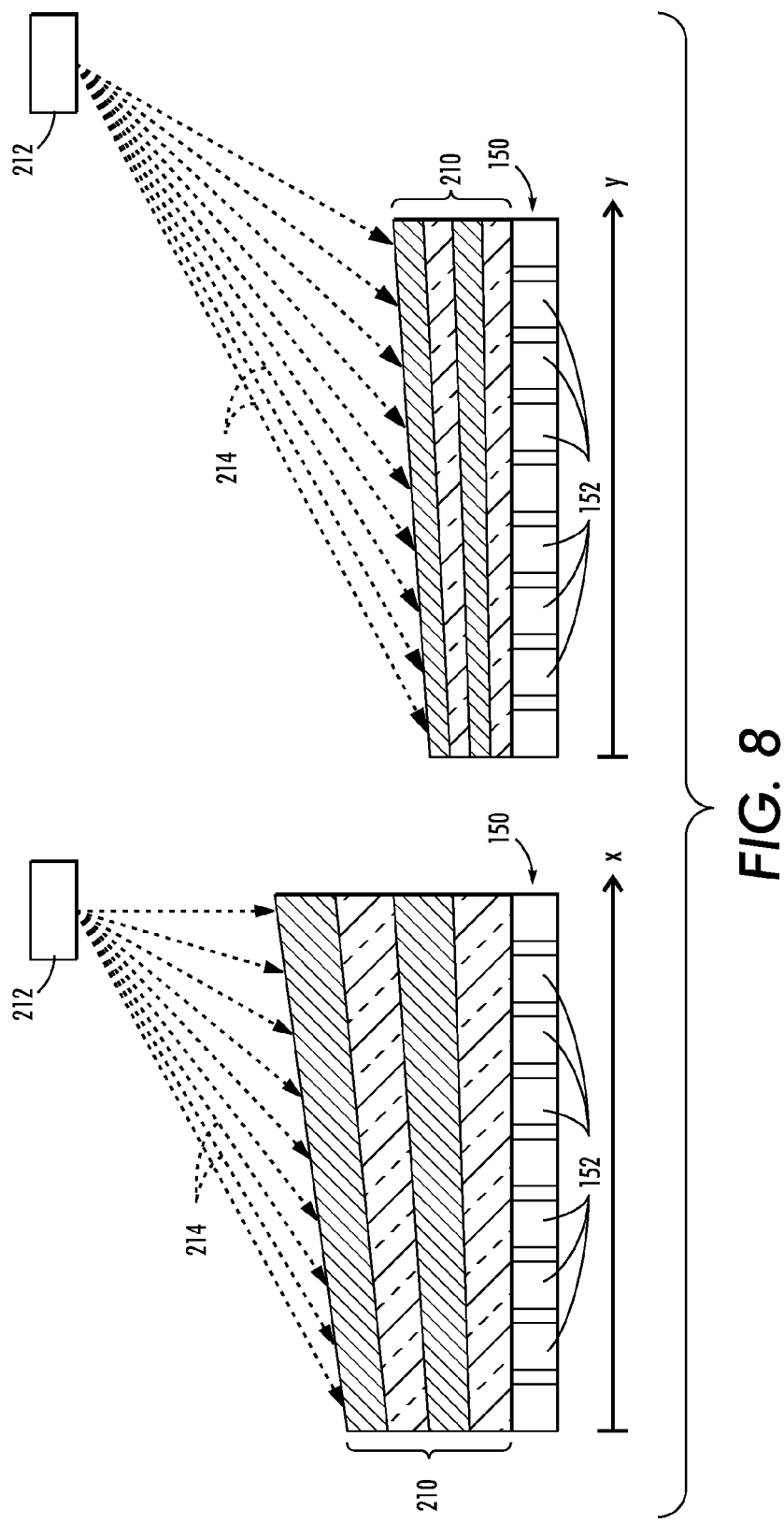
FIG. 8 illustrates a technique that produces a transmission structure that can be used in a system such as in FIG. 1, showing orthogonal schematic cross-sectional views of deposition.

In FIG. 8, transmission structure 210 is produced to transmit light with lateral variation in each of two dimensions. Deposition source 212 provides deposition beam 214 with angular variation in both the x-direction across array 150 (shown at left) and the y-direction (shown at right).

Figure 9:
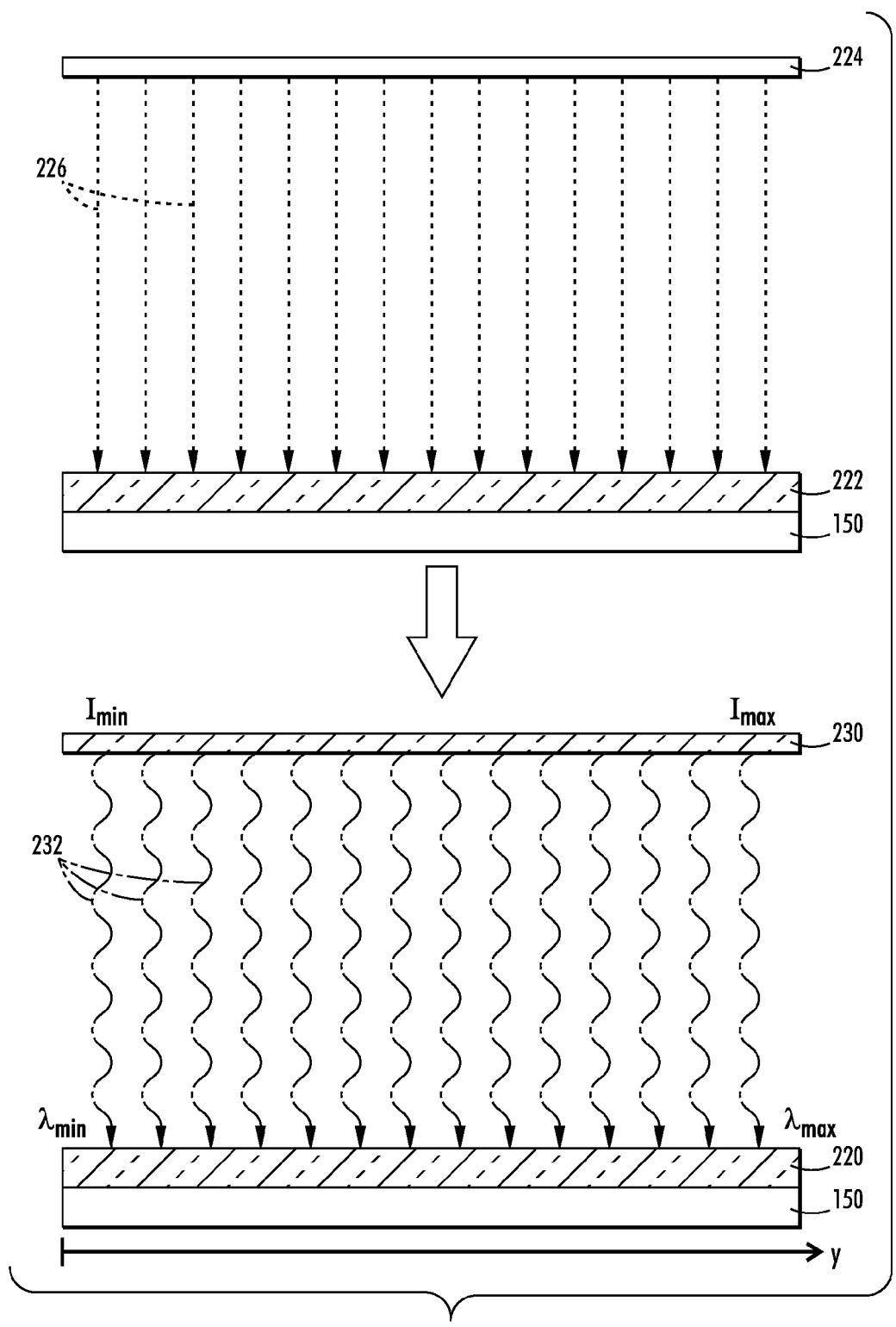
FIG. 9 illustrates another technique for producing a transmission structure that can be used in a system such as in FIG. 1, showing two schematic cross-sectional views of stages of the technique.

In FIG. 9, transmission structure 220 has uniform thickness d but is produced to transmit light with lateral variation due to laterally varying optical thickness d*n, where n is index of refraction. First, homogeneous coating 222 is deposited by deposition source 224, which provides deposition beam 226 uniformly over the surface of photosensor array 150 (upper view); then, light source 230, e.g. an ultraviolet source, is scanned across the coating to introduce a laterally varying change of refractive index in structure 220 due to intensity I varying from $I_{min}$ at left to $I_{max}$ at right, so that transmitted wavelengths vary from $\lambda_{min}$ to $\lambda_{max}$.

Figure 10:
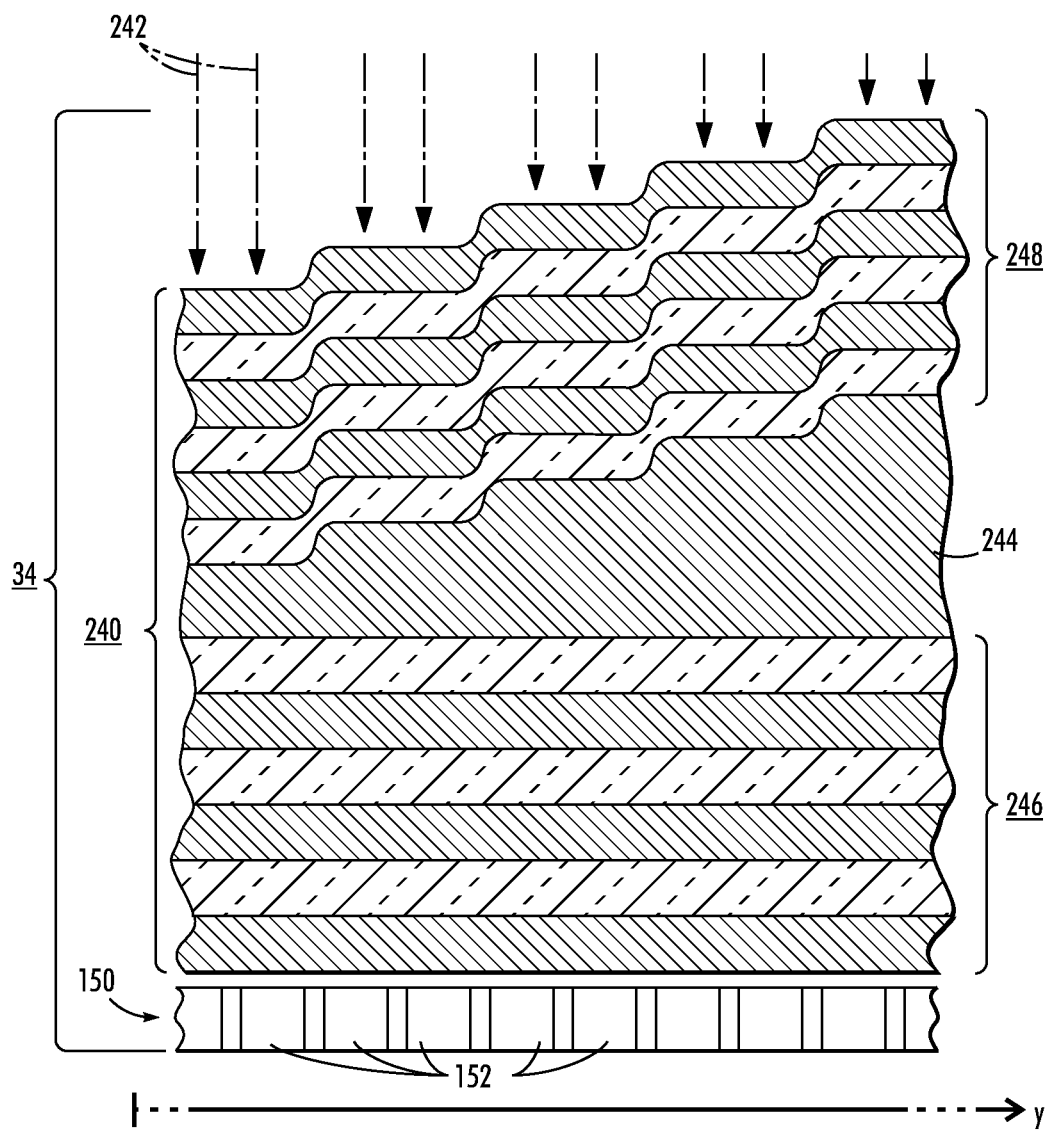
FIG. 10 is a schematic cross-sectional view of another implementation of a transmission structure that can be used in a system such as in FIG. 1.
Figure 11:
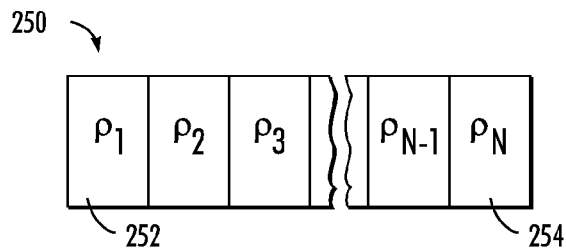
FIG. 11 is a schematic top view of a mask that could be used to produce a transmission structure as in FIG. 10.

FIG. 10 shows transmission structure 240 receiving incident light 242. Transmission structure 240 includes staircase-shaped transmission cavity 244 enclosed between reflective films 246 and 248, with a step-like gradient in the y-direction, yet another example of how light can be transmitted with lateral variation. FIG. 11 illustrates half-tone mask 250 that can be used in producing transmission structure 240 and other such structures; mask 250 includes a series of N rectangular regions 252 through 254, each with holes allowing material to pass through but with density of holes increasing from $\rho_1$ to $\rho_N$.

A particular advantage of sub-band sensing as in FIGS. 1 and 2, when implemented with techniques similar to those of FIGS. 3-11, is that laterally varying transmission and reflection properties of the coating over the photosensor array define a correlation between position and photon energy. Therefore, sensing results can depend on position and a spatially dependent signal from the photosensor array can contain spectral information about light and dark narrow bands. This advantage can also be obtained with light received across a range of incident angles, as illustrated and described in relation to FIG. 17 of U.S. patent application Ser. No. 11/633,302, even with a homogeneous transmission structure.

FIGS. 12-27 illustrate ways to provide input light to an assembly such as assembly 34, and are described in greater detail, together with variations and alternatives, in co-pending U.S. Pat. Nos. 7,522,786 and 7,701,590, both of which are incorporated herein by reference in their entireties. Several figures show array 260 covered by coating 262, a transmission structure that transmits light with lateral variation, e.g. in one of the ways described above.

Figure 12:
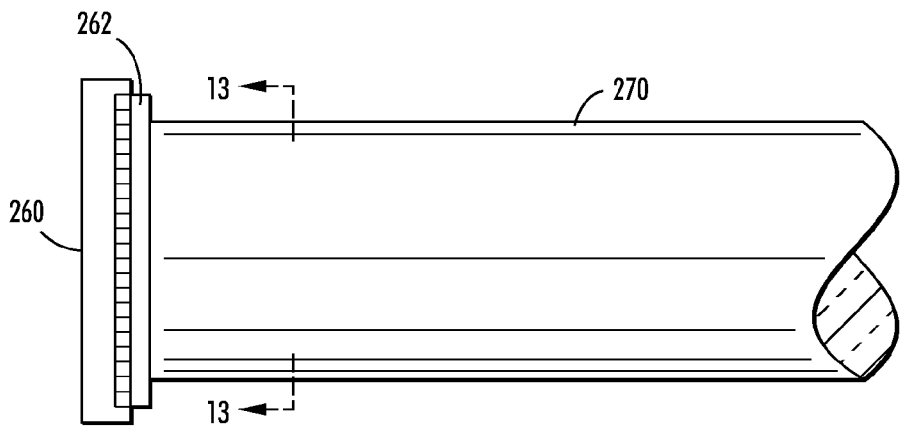
FIG. 12 is a schematic side view of an implementation of a device that can be used in a system such as in FIG. 1.
Figure 13:
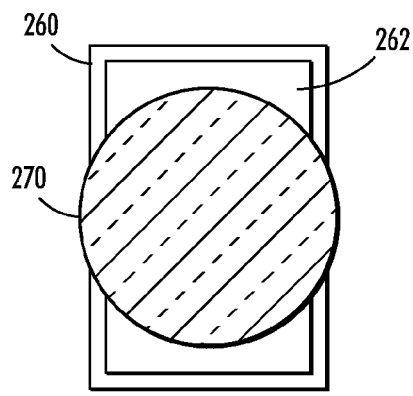
FIG. 13 is a cross-sectional view of the implementation of FIG. 12, taken along the line 13-13.

In FIGS. 12-13, fiber 270 provides input light and is positioned as close as possible to the surface of coating 262. Fiber 270 can have approximately the same cross-sectional area as the area of array 260.

Figure 14:
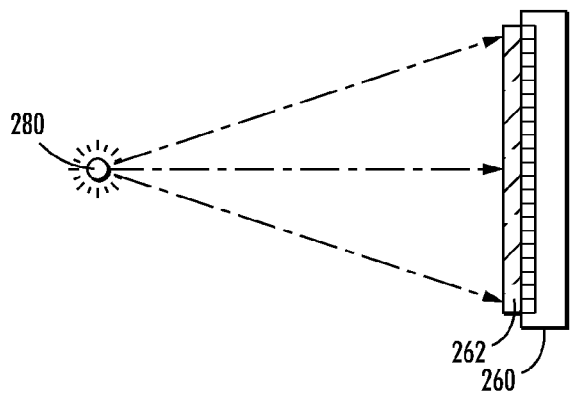
FIG. 14 is a schematic side view of another implementation of a device that can be used in a system such as in FIG. 1.

In FIG. 14, input light source 280 is a point-like source such as an LED or an optical fiber that provides a divergent input light beam and is positioned a sufficient distance from coating 262 to illuminate the entire sensing area of photosensor array 260.

Figure 15:
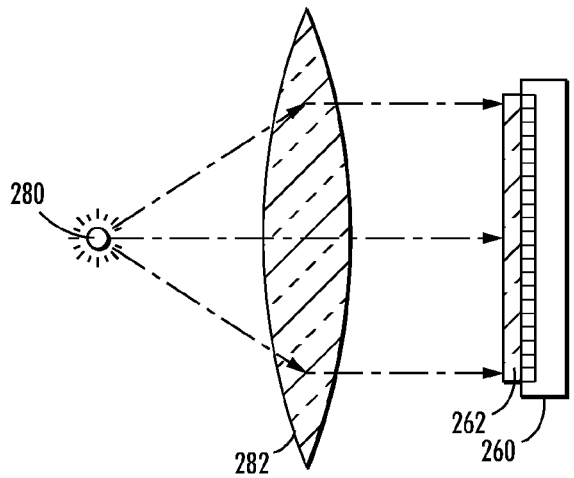
FIG. 15 is a schematic side view of another implementation of a device that can be used in a system such as in FIG. 1.

In FIG. 15, lens 282 is positioned between input light source 280 and coating 262, making the divergent beam from source 280 parallel. Alternatively, lens 282 could image a broad area light source (e.g. a fiber end facet) onto coating 262.

Figure 16:
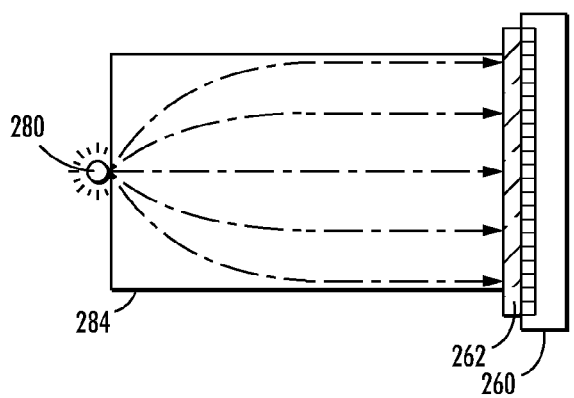
FIG. 16 is a schematic side view of another implementation of a device that can be used in a system such as in FIG. 1.

In FIG. 16, optical component 284 is positioned between point-like input light source 280 and coating 262. Component 284 can be a SELFOC® or gradient index (GRIN) lens.

Figure 17:
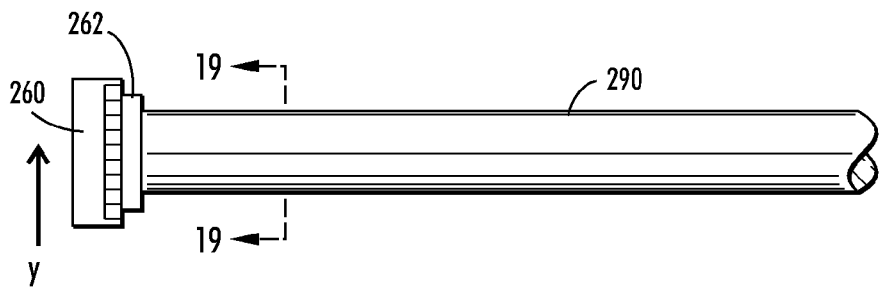
FIG. 17 is a schematic side view of another implementation of a device that can be used in a system such as in FIG. 1.
Figure 18:
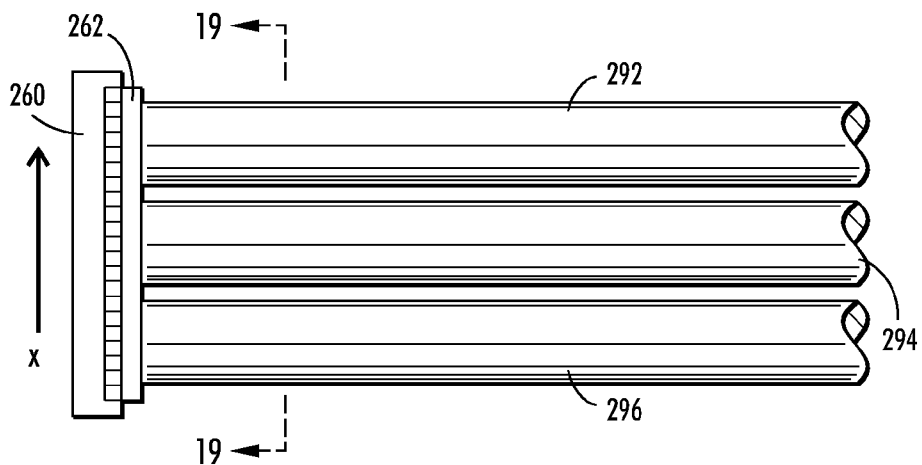
FIG. 18 is a schematic top view of the implementation in FIG. 17.
Figure 19:
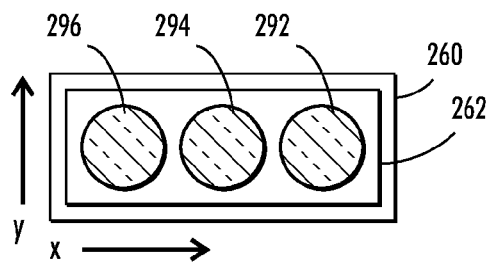
FIG. 19 is a cross-sectional view of the implementation as in FIGS. 17 and 18, taken along the lines 19-19.

In FIGS. 17-19, bundle 290 of glass or polymer optical fibers 292, 294, and 296 is butt-coupled, i.e. positioned as close to coating 262 as possible.

Figure 20:
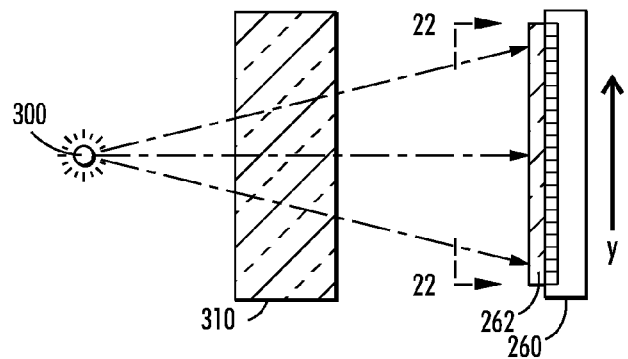
FIG. 20 is a schematic top view of another implementation of a device that can be used in a system such as in FIG. 1.
Figure 21:
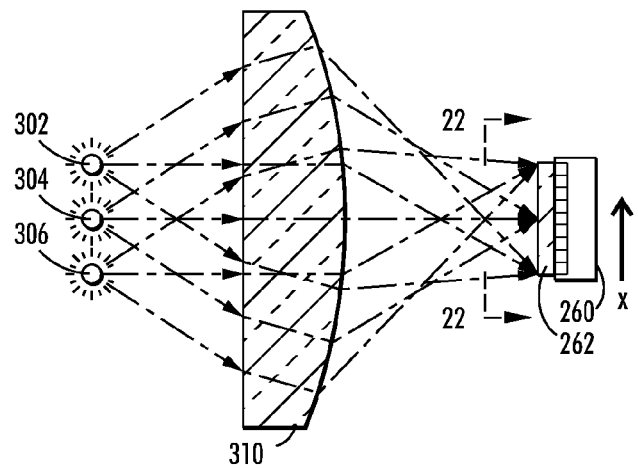
FIG. 21 is a schematic side view of the implementation of FIG. 20.
Figure 22:
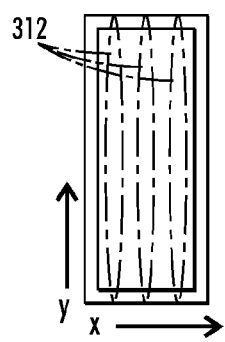
FIG. 22 is a cross-sectional view of the implementation of FIGS. 20 and 21, taken along the lines 22-22.

In FIGS. 20-22, divergent beams from different input light sources, represented in FIG. 20 by aligned source 300 and in FIG. 21, by separate sources 302, 304, and 306. Lens 310 is a plano-convex cylindrical lens that focuses each beam in the x-direction while permitting each beam to spread in the y-direction, resulting in multiple spots or stripes 312.

Figure 23:
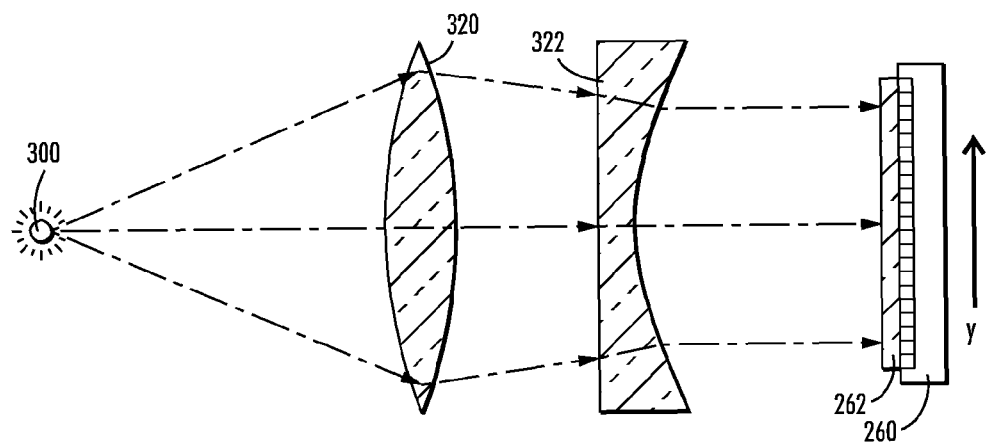
FIG. 23 is a schematic top view of another implementation of a device that can be used in a system such as in FIG. 1.
Figure 24:
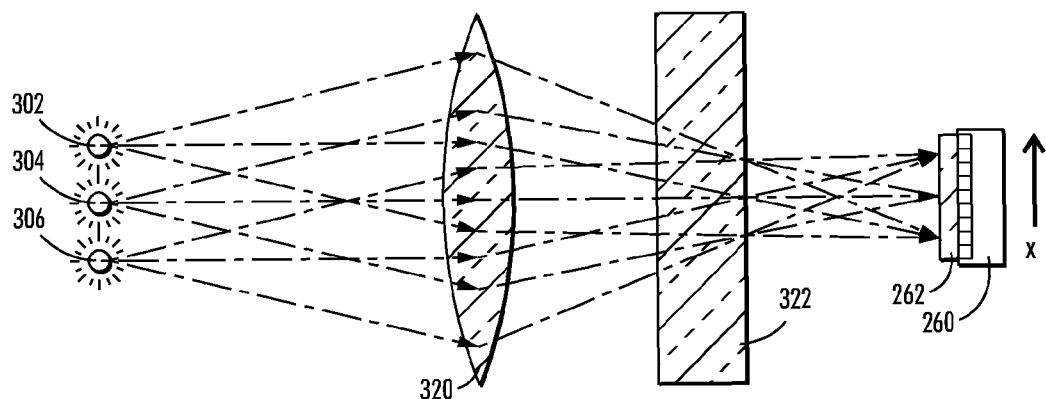
FIG. 24 is a schematic side view of the implementation of FIG. 23.

In FIGS. 23 and 24, imaging lens 320 and plano-concave cylindrical lens 322 image input light beams in the x-direction to avoid cross-talk between beams, but allow each beam to remain spreaded over the whole width of array 260 in the y-direction.

Figure 25:
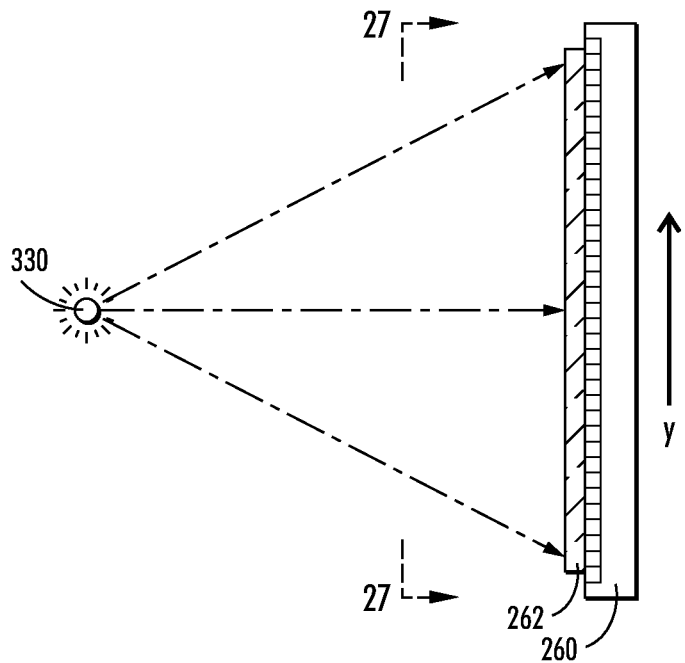
FIG. 25 is a schematic top view of another implementation of a device that can be used in a system such as in FIG. 1.
Figure 26:
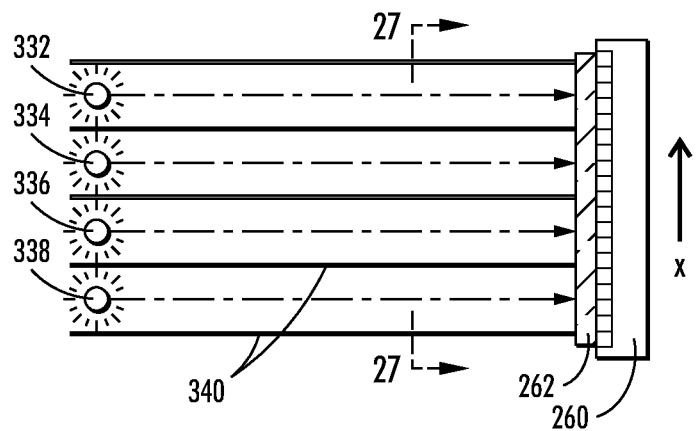
FIG. 26 is a schematic side view of the implementation of FIG. 25.
Figure 27:
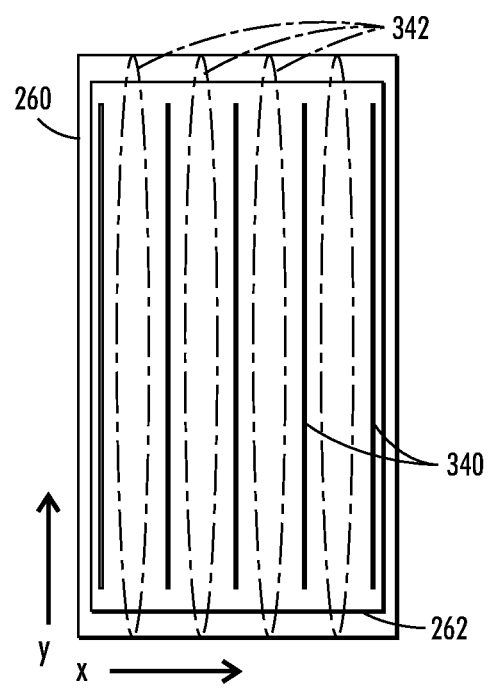
FIG. 27 is a cross-sectional view of the implementation of FIGS. 25 and 26, taken along the lines 27-27.

In FIGS. 25-27, multiple point-like or stripe-like light sources such as LEDs or linear fiber bundles are represented in FIG. 25 by aligned source 330 and in FIG. 26 by individual sources 332, 334, 336, and 338. Blades 340, which could be reflecting blades, prevent cross-talk so that a pattern of multiple spots or stripes 342 is produced.

Figure 28:
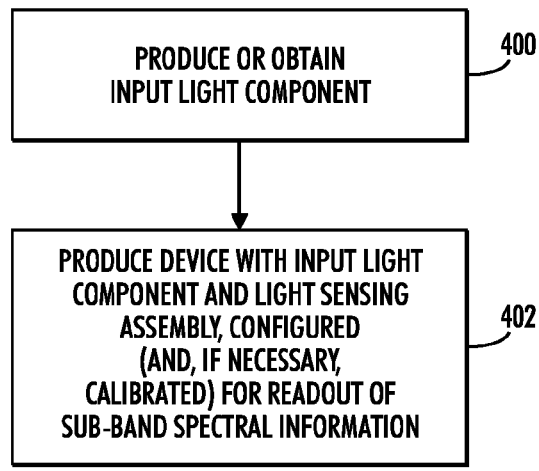
FIG. 28 is a flow chart showing operations performed in producing and using a type of device that can be used in a system such as in FIG. 1.

FIG. 28 illustrates exemplary operations in producing a system like system 10 in FIG. 1. In particular, the operations in FIG. 28 make it possible to produce a system in which input light that includes one or more sub-bands is incident on read-out components that obtain spectral information about the sub-bands.

The operation in box 400 in FIG. 28 produces or obtains an input light component of any of the types described herein or of any other appropriate type. For example, the operation in box 400 could produce a fiber-optic sensor with FBGs, a POF sensor, a photonic crystal sensor, an optical cavity sensor, an optical biosensor, an SPR sensor, etc.

The operation in box 402 then produces a device with the input light component from box 400 and a light sensing assembly, configured so that input light is incident on the light sensing assembly and sub-band spectral information can be read out, such as in one of the ways described above in relation to FIGS. 12-27. This operation can be performed in any appropriate way, including butt-coupling as in FIGS. 12, 17, and 18 or with spaced components as in FIGS. 14, 15, 20, 21, and 23-26, and can include one or more spreading components or other propagation components in the device as appropriate.

As shown, the operation in box 402 can also include calibration, which may be necessary in order to obtain accurate spectral information from sensing results. Examples of calibration techniques are described, for example, in co-pending U.S. Pat. No. 7,701,590 and incorporated herein by reference in its entirety. The operation in box 402 can also include or be followed by other operations involving connection to or signal exchange with electrical components, some examples of which are described below. For example, to obtain differential signals indicating particular wavelength shifts, appropriate pairs of cells in a photosensor array can be selected for comparison or discrete photosensors can be positioned to provide photosensed quantities for comparison.

Figure 29:
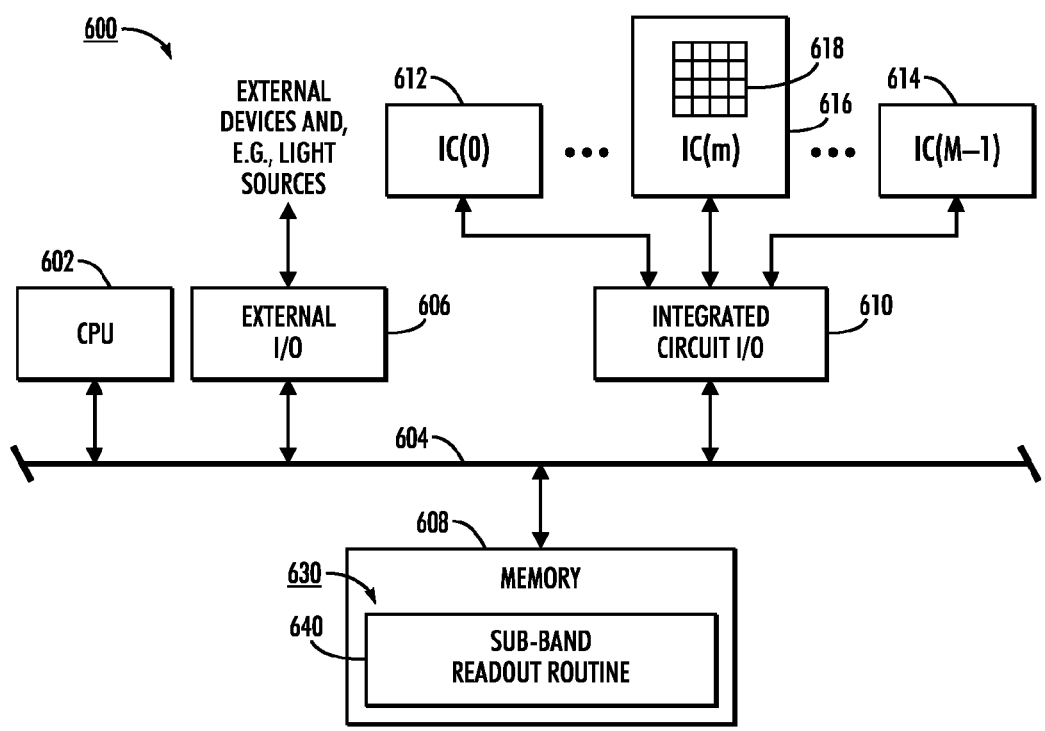
FIG. 29 is a schematic block diagram of electrical components that could be included in a system as in FIG. 1.

FIG. 29 illustrates electrical components that could be included in a system as in FIG. 1. In FIG. 29, system 600 is an exemplary sub-band sensing system that could be used to obtain spectral information for sub-bands in input light as described above. System 600 illustratively includes central processing unit (CPU) 602 connected to various components through bus 604, but a wide variety of other architectures could be employed, including any appropriate combination of hardware and software, as well as specialized hardware components such as application specific integrated circuits (ASICs) for one or more of the illustrated components or in place of a software component executed by CPU 602.

System 600 also includes external input/output (I/O) component 606 and memory 608, both connected to bus 604. External I/O 606 permits CPU 602 to communicate with light sources in component 12, if any, and also with devices outside of system 600. For interactive applications, external I/O 606 could be connected to a suitable user interface, such as a monitor and keyboard (not shown). Additional components connected to bus 604 are within or connected to system 600. In the illustrated implementation of system 600, IC I/O 610 is a component that permits CPU 602 to communicate with one or more ICs in sensing assembly 34. M ICs are illustrated by a series from IC(0) 612 to IC(M−1) 614, including IC(m) 616 with a photosensor array 618.

Memory 608 illustratively includes program memory 630, although instructions for execution by CPU 602 could be provided in any of the ways described above and memory 608 could also include data memory, such as storing calibration data. The routines stored in program memory 630 illustratively include sub-band readout routine 640. In addition, program memory 630 could store various additional subroutines (not shown) that CPU 602 could call in executing routine 640.

In executing routine 640, CPU 602 can provide signals to each of ICs 612 through 614 to read out subrange cells and to compare the photosensed quantities to obtain spectral information about sub-bands such as differential quantities. Before comparison, routine 640 can also optionally read out reference cells and use their photosensed quantities to adjust photosensed quantities from subrange cells, such as with techniques described in U.S. Pat. No. 7,291,824, incorporated herein by reference. In an implementation with a position-sensitive detector, as described below, CPU 602 could instead provide whatever signals are necessary to obtain photosensed quantities; for example, CPU 602 could control circuitry to connect output currents from the position-sensitive detector to a differential amplifier.

Routine 640 can perform comparison and other operations in several ways, depending on the type of spectral information being obtained. In some cases, a differential signal is obtained from one distribution of photon energies, which can be useful, such as to obtain information about a distribution. In other cases, wavelength shift information is obtained, such as between two peak or minimal energy values. Monitoring techniques could be used, as described in co-pending U.S. Pat. No. 7,701,590, and incorporated herein by reference in its entirety.

To obtain a differential quantity from one distribution of photon energies, currents indicating photosensed quantities from a position-sensitive detector (PSD) or photosensed quantities from two cells or two sets of cells can be compared similarly to the technique illustrated in FIG. 2; with appropriate differential amplifier circuitry on an IC, routine 640 may be able to perform the comparison with especially high resolution by controlling readout from the cells to the differential amplifier, after which the analog comparison result can be converted to a digital value for transfer through bus 604 to CPU 602. A differential amplifier can be used for an especially high resolution comparison of intensities of two different PSD currents. Rather than a differential amplifier, any other suitable analog component could be used that provides a biased or unbiased analog difference or analog ratio.

To obtain wavelength shift information, a comparison can be performed on photosensed quantities to sense a change in photon output position. For example, when the output from a differential amplifier as in FIG. 2 makes a transition between high and low, the transition could indicate a shift of peak energy value between $\lambda_a$ and $\lambda_b$; such a transition could alternatively indicate a shift of minimal energy value. In this and other implementations where wavelength shift or other wavelength change occurs over time and photosensing is performed over time, CPU 602 or other suitable circuitry can apply an appropriate change criterion (e.g. high to low or low to high transition in differential output) to identify a time of change, e.g. by identifying time of a change in relative quantities provided at two positions; the identified time of change can then be used to obtain information about time of a change that caused the wavelength change, e.g. a change between two stimulus values.

Rather than performing analog comparison, as described in the examples above, photosensed quantities could instead be digitized before comparison, in which case CPU 602 could perform any appropriate routine to obtain a digital differential quantity or any other data indicating a comparison result for two or more positions. Such a routine could also include normalizing or otherwise adjusting each digitized value prior to comparison. The routine could perform subtraction, division, or any other operation that produces a result indicating the difference between or among photosensed quantities from two or more positions.

Although digital comparison is not likely to be as precise as high resolution analog comparison, it may allow greater flexibility. For example, rather than simply performing pairwise comparison, CPU 602 could divide all the non-zero or above-threshold photosensed quantities into two groups in any appropriate way, add the quantities to obtain a summed quantity for each group, and then compare the summed quantities, possibly after weighting for difference in the number in each group. The groups could be chosen based on position or any other suitable criterion.

More generally, to increase resolution, CPU 602 can compare photosensed quantities with calibration values. The term "calibration value" is used herein to refer to any value obtained by a measurement that either establishes a standard or is based on a previously established standard. A calibration value could, for example, indicate how to categorize, weight, or otherwise interpret, adjust, or correct a given measured value such as a photosensed quantity or photosensed position. Once obtained, a calibration value is typically saved in an appropriate form for subsequent comparison with measured values. Where a calibration value indicates a quantity of photons, it may be referred to as a "calibration quantity".

Absolute wavelength resolution is important to quantify the absolute value of a sub-band's photon energy, while relative wavelength resolution is important to quantify the change in a sub-band's photon energy. Both types of resolution may employ calibration to obtain calibration values for later comparison. It should be noted, however, that absolute wavelength calibration can change more easily than relative wavelength calibration as a result of small changes in the setup (e.g. non-collimated light input), so that relative wavelength resolution is more robust.

During calibration, the readout components are illuminated with a known light source and the response is stored in an appropriate calibration data structure. Exemplary calibration techniques are described in U.S. Pat. No. 7,310,153, and incorporated herein by reference in its entirety.

For absolute wavelength information, a calibration data structure can indicate correspondences between positions and wavelengths; for relative wavelength information, a calibration data structure can indicate correspondences between position differences or relative photosensed quantities, on the one hand, and wavelength, peak value, distribution, or stimulus value differences on the other. Routine 640 can compare quantities it reads out with one or more calibration data structures to obtain either or both of these types of information.

Routine 640 can also obtain a respective differential quantity for each of a number of distributions that are received on a transmission structure's entry surface. Routine 640 can include or call subroutines to handle special cases, such as where distributions are received in sequence or in parallel.

In cases where first and second distributions are received in sequence or one after the other, routine 640 can obtain the first distribution's differential quantity before the second distribution is received. This will be achievable, for example, if there is a sufficiently long time period between the two distributions to allow CPU 602 to complete photosensing and then obtain the differential quantity. If the distributions resulted from different values of a stimulus, the two differential quantities from the distributions could be compared to obtain information about the stimulus.

In other cases, first and second distributions can be received in parallel or concurrently, such as in one of the multiple light source implementations in FIGS. 17-27. In these cases, techniques as described above make it possible to separate the positions of the light from each source sufficiently that the two distributions can be photosensed independently and a differential quantity can be obtained for each. For example, in a photosensor array implementation, routine 640 can readout photosensed quantities from cells or sets of cells in each distribution's region or set of positions on the exit surface. For example, in response to the first distribution, a first region or set of positions of the exit surface would provide output photons that could be photosensed and read out, and similarly for the second distribution in another region or set of positions. Routine 640 could then use quantities read out for one of the distributions to obtain the distribution's differential quantity.

In general, these are all examples in which photosensed quantities are used to obtain at least one differential quantity "that compares photosensed quantities from the same distribution", meaning that the differential quantity was obtained by comparing two or more photosensed quantities of output photons from the same distribution, whether the first distribution, the second distribution, or another distribution. A differential quantity obtained by comparing photosensed quantities from two or more different distributions would not be an example of such a differential quantity.

Wavelength information obtained by routine 640 can be combined in an appropriate data structure (not shown), such as by forming a data array or list. After wavelength information has been obtained, CPU 602 can use the raw wavelength information, for example, to calculate or obtain from a calibration data structure a corresponding value for a sub-band's photon energy or photon energy change. CPU 602 can provide spectral information or corresponding values through external I/O 606. For example, all of the wavelength information or corresponding values could be combined into a single data structure and provided through external I/O 606 through a suitable streaming operation. In monitoring, CPU 602 could use spectral information in providing control signals to light sources through external I/O 606.

In general, system 600 could be implemented with any devices that provide input light that includes one or more sub-bands. Furthermore, system 600 could be implemented for many applications, some of which are illustrated below.

FIGS. 30-39 illustrate exemplary implementations of apparatus that include a system as in FIG. 1, and are described in greater detail, together with variations and alternatives, in co-pending U.S. Pat. Nos. 7,522,786 and 7,701,590, both of which are incorporated herein by reference in their entireties. Each implementation illustrates effects due to transmission of light with lateral variation.

Figure 30:
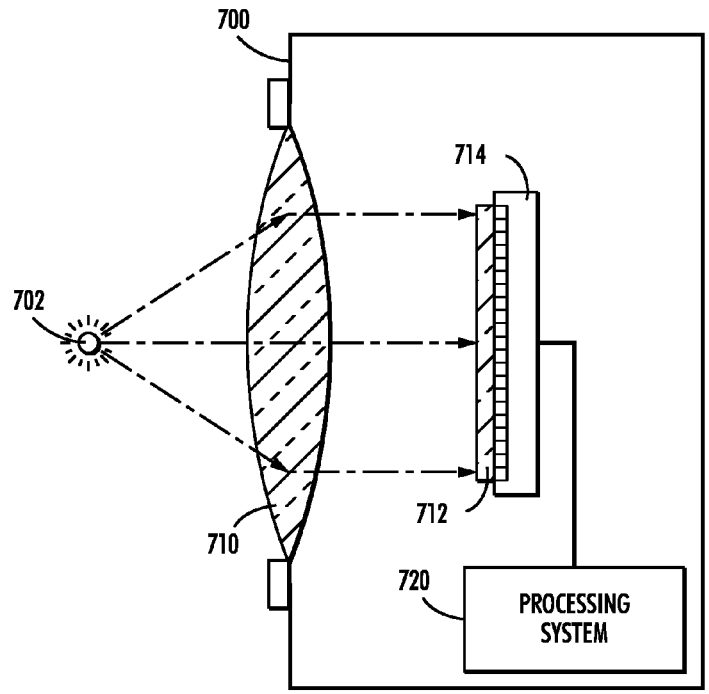
FIG. 30 is a schematic diagram of a camera that exemplifies a system as in FIG. 1.
Figure 31:
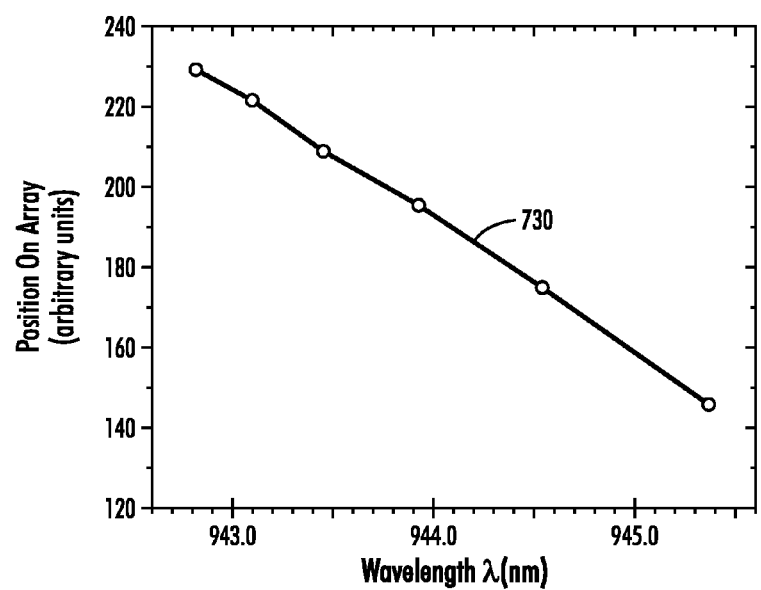
FIG. 31 is a graph showing results obtained from an implementation of the camera in FIG. 30.

In FIG. 30, camera 700, which includes a system as in FIG. 1, receives input light, e.g. from point-like source 702, collimated onto an assembly that includes a laterally varying transmission structure such as coating 712 and also a photosensing component such as IC 714. Processing system 720 obtains readout signals from IC 714 and uses them to obtain wavelength information, e.g. for a narrow band or other sub-band in the input light. FIG. 31 summarizes positions obtained visually for wavelengths, and curve 730 connects position values of spots for the wavelengths. Curve 730 shows how spot position changes in response to wavelength, an example of an effect due to transmission of light with lateral variation.

Figure 32:
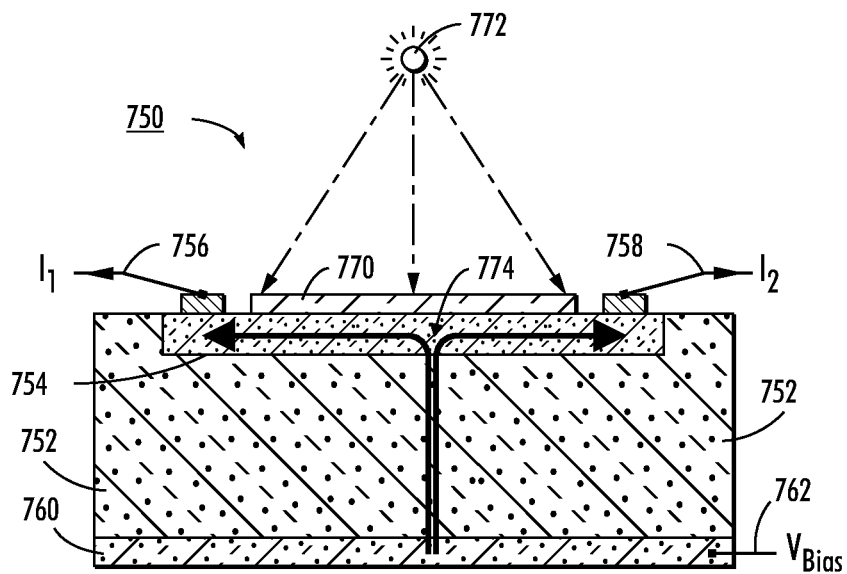
FIG. 32 is a schematic side view of a test implementation of a system as in FIG. 1 with an assembly that includes a position sensor.

In FIG. 32, device 750 includes a three-terminal semiconductor position-sensitive detector (PSD) with n-type silicon substrate 752 in which two resistive layers are separated by a p-n junction; on the upper side is ion implanted p-type resistive layer 754 with two contacts or electrodes 756 and 758 at opposite ends, and on the lower side is ion implanted n-type resistive layer 760, serving as the device's bias electrode 762. Over the upper surface is a laterally varying transmission structure 770, and when light source 772 illuminates structure 770 with a single wavelength narrow band, structure 770 provides a light spot at the wavelength's corresponding position 774, and photocurrent flows from point 774 to electrodes 756 and 758, indicating location of position 774.

Figure 33:
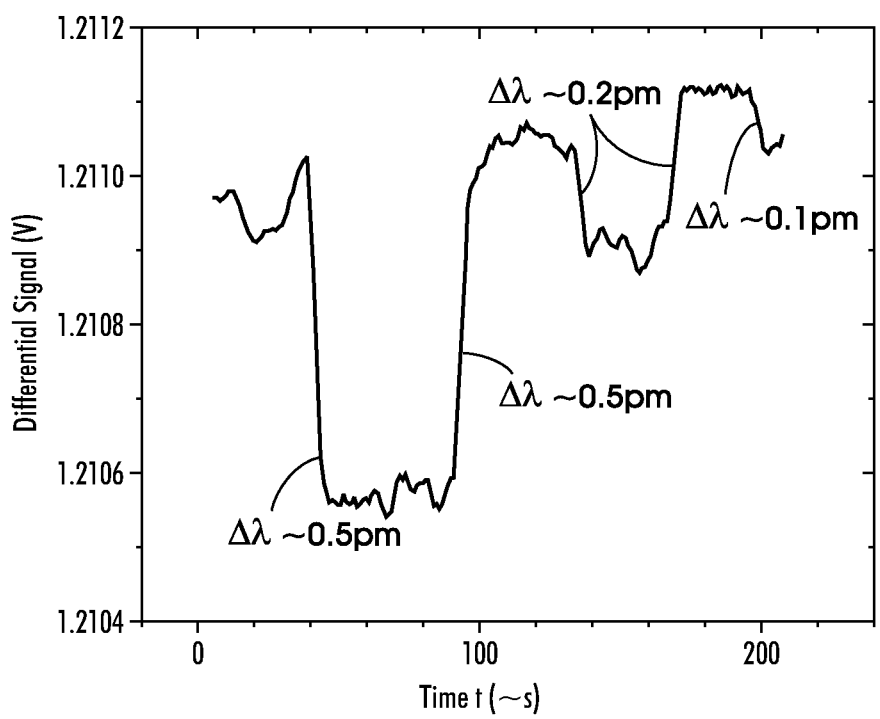
FIG. 33 is a graph showing response to change in wavelength for the test implementation of FIG. 32.

The graph in FIG. 33 shows a differential signal across electrodes 756 and 758 as a function of time, with illumination wavelength incremented and decremented, producing detectable nearly instantaneous excursions of signal. The graph shows how spot position changes over time in response to change over time of illumination wavelength, another example of an effect due to transmission of light with lateral variation. As described above, each signal excursion could be automatically detected by applying an appropriate change criterion, e.g. a slope-based criterion, and each excursion's time could be identified and used to obtain information about the time of its cause.

PSDs could similarly be used in implementations with dark sub-bands and corresponding dark spots: PSD currents, such as from electrodes 756 and 758, also indicate position of a suitably sized dark spot on a PSD's surface, although not in the same way they indicate light spot position. Therefore, to correctly interpret PSD currents, it must be known whether the pattern of light on the PSD's surface includes a light spot or a dark spot. Also, for precise wavelength or wavelength shift values, calibration might be necessary, as described above.

Figure 34:
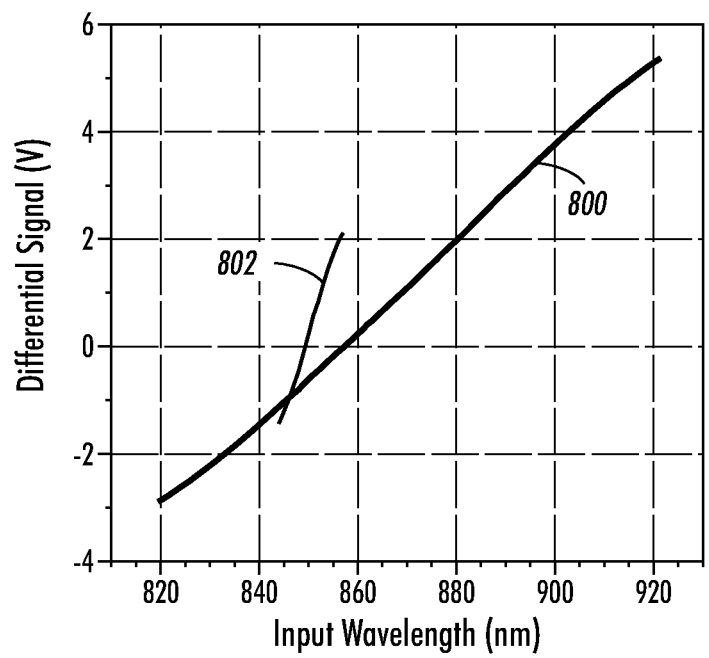
FIG. 34 is a graph showing differential signal as a function of input wavelength for another version of the test implementation of FIG. 32.
Figure 35:
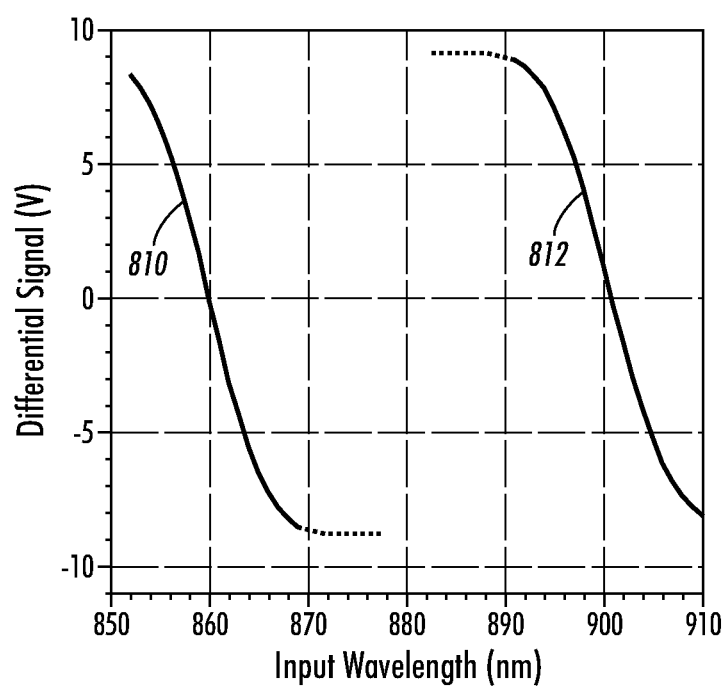
FIG. 35 is a graph showing differential signal as a function of wavelength for a test implementation with an assembly that includes cells as in FIG. 3.

The graphs in FIGS. 34 and 35 illustrate results of modifications of FIG. 32. In FIG. 34, light source 772 was a spectrally filtered halogen lamp providing monochromatic light in a narrow band with FWHM of about 1 nm, and with capability of tuning or sweeping the wavelength over a large range; for curve 800, structure 770 had a wavelength-to-distance gradient of 32 nm/mm, and for curve 802, a gradient of 4 nm/mm. In FIG. 35, a photosensor array replaced the PSD and three consecutive cells in a row were connected to two differential amplifiers, one comparing the first and second cells per curve 810 and the other comparing the second and third per curve 812. Each of these curves shows how differential signal changes in response to wavelength change, providing further examples of effects due to transmission of light with lateral variation.

Figure 36:
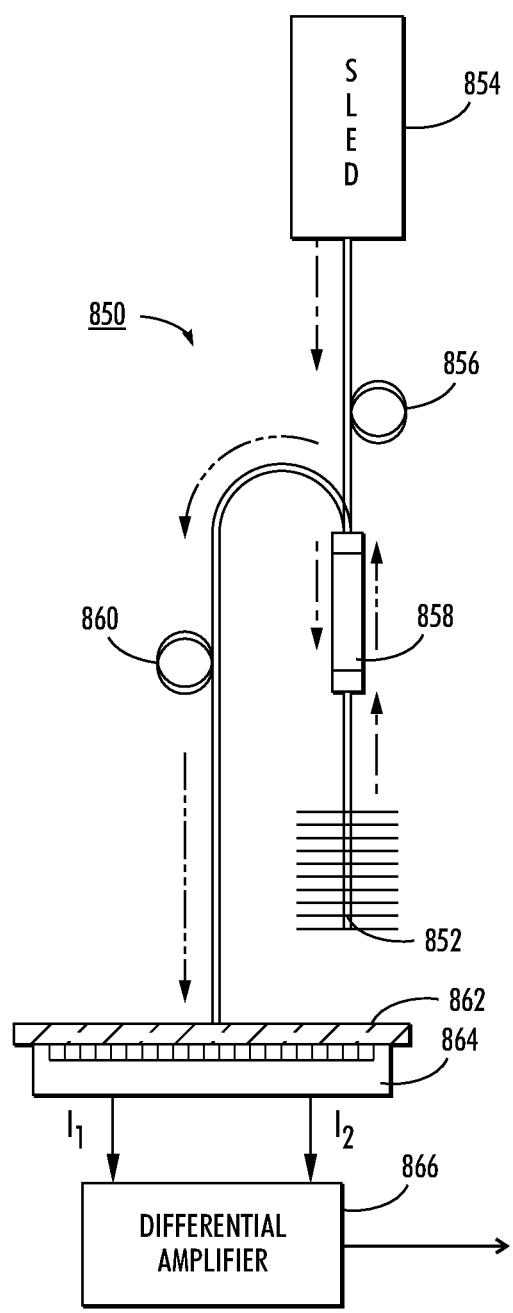
FIG. 36 is a schematic diagram of a test implementation of a system as in FIG. 1 to measure temperature.
Figure 37:
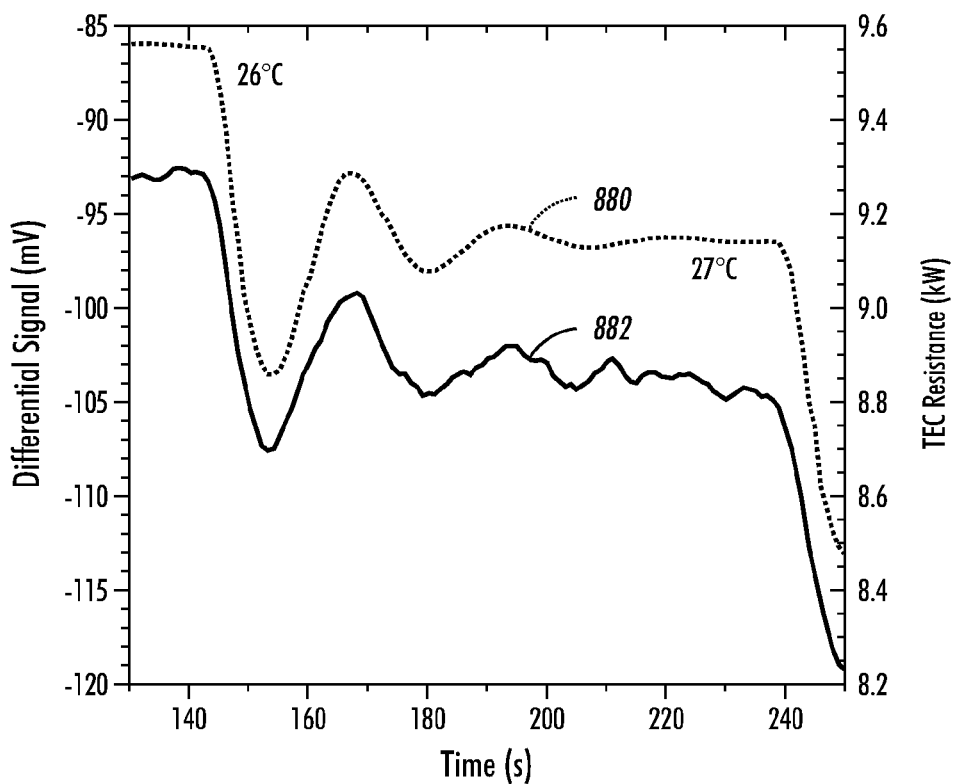
FIG. 37 is a graph showing signal response over time for the test implementation of FIG. 36.
Figure 38:
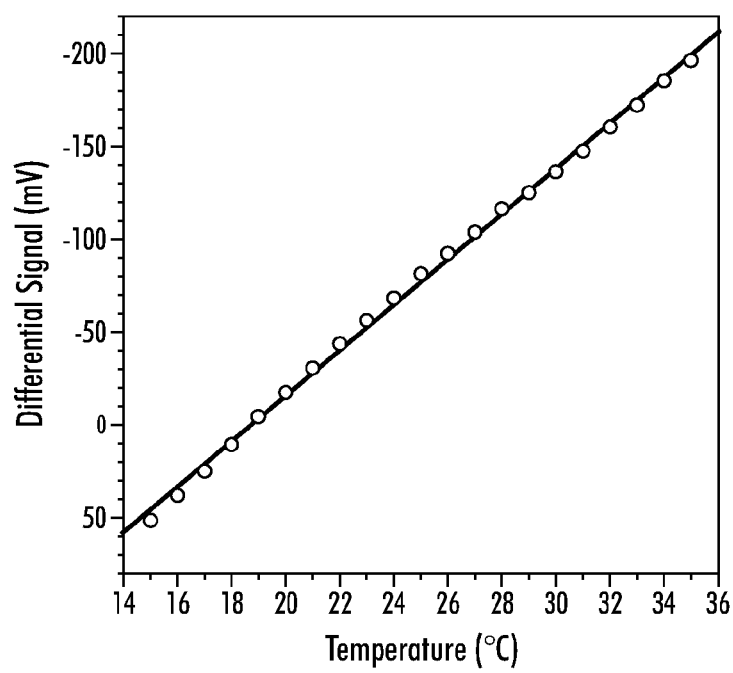
FIG. 38 is a graph showing differential signal as a function of temperature for the test implementation of FIG. 37.

In FIG. 36, temperature sensing device 850 includes FBG sensor 852, mounted on a cooling/heating element connected to a temperature controller that can tune temperature by adjusting heating/cooling current. Light source 854 is a super luminescent emitting diode (SLED) providing light in a narrow band to sensor 852 through fiber 856 and coupler 858. Sensor 852 reflects a light narrow band with wavelength indicating information about temperature, which returns through coupler 858 and fiber 860 to laterally variable transmission structure 862, resulting in a spot of light on photodiode array 864. Two cells of array 864 provide output currents $I_1$ and $I_2$ to differential amplifier 866, which provides a differential signal indicating wavelength, as shown in FIG. 37. Curve 880 indicates resistance of a temperature monitoring thermistor integrated into the cooling/heating element; curve 882 indicates the differential signal, which follows curve 880, especially during transients, and could be used to automatically obtain information about time of temperature changes in the manner described above. Curve 882 thus shows how the differential signal changes over time in response to change over time of temperature, another example of an effect due to transmission of light with lateral variation. FIG. 38 shows steady state differential signal as a function of temperature, with circles indicating temperature measurements. The graph in FIG. 38 shows how steady state differential signal changes in response to change of temperature, yet another example of an effect due to transmission of light with lateral variation.

Figure 39:
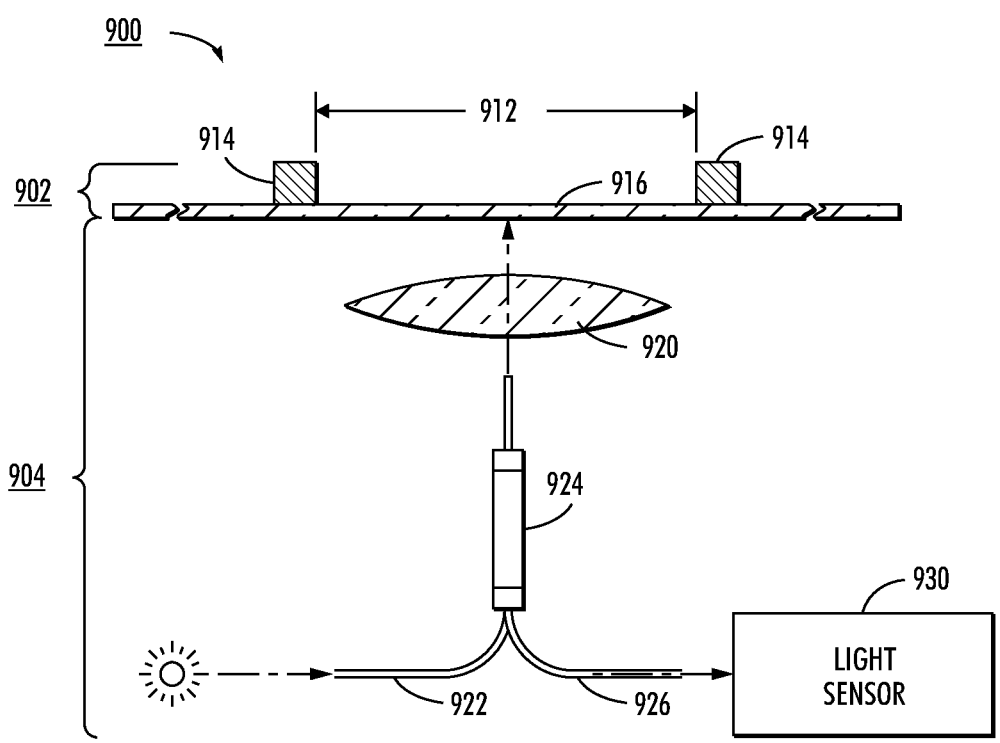
FIG. 39 is a schematic side view of an implementation of a system as in FIG. 1 to obtain information from a well plate.

In FIG. 39, device 900 includes 96-well plate 902 and readout components 904. Each well 912 is surrounded by walls 914 that together form a stable lattice-like structure on one side of which foil grating 916 is mounted. The fluid or other contents of well 912 modify reflected wavelength of the well's region of grating 916. The well's region of grating 916, when illuminated with collimated broadband light, is designed to reflect only a light narrow band of wavelengths that depends on the fluid or other contents of well 912. Readout components 904 for each well include collimating lens 920, receiving broadband light through illuminating fiber 922 contained in optical fiber probe 924 with readout fiber 926. Readout fiber 926 transmits a reflected light narrow band to light sensor assembly 930 to obtain wavelength information as described above.

Figure 40:
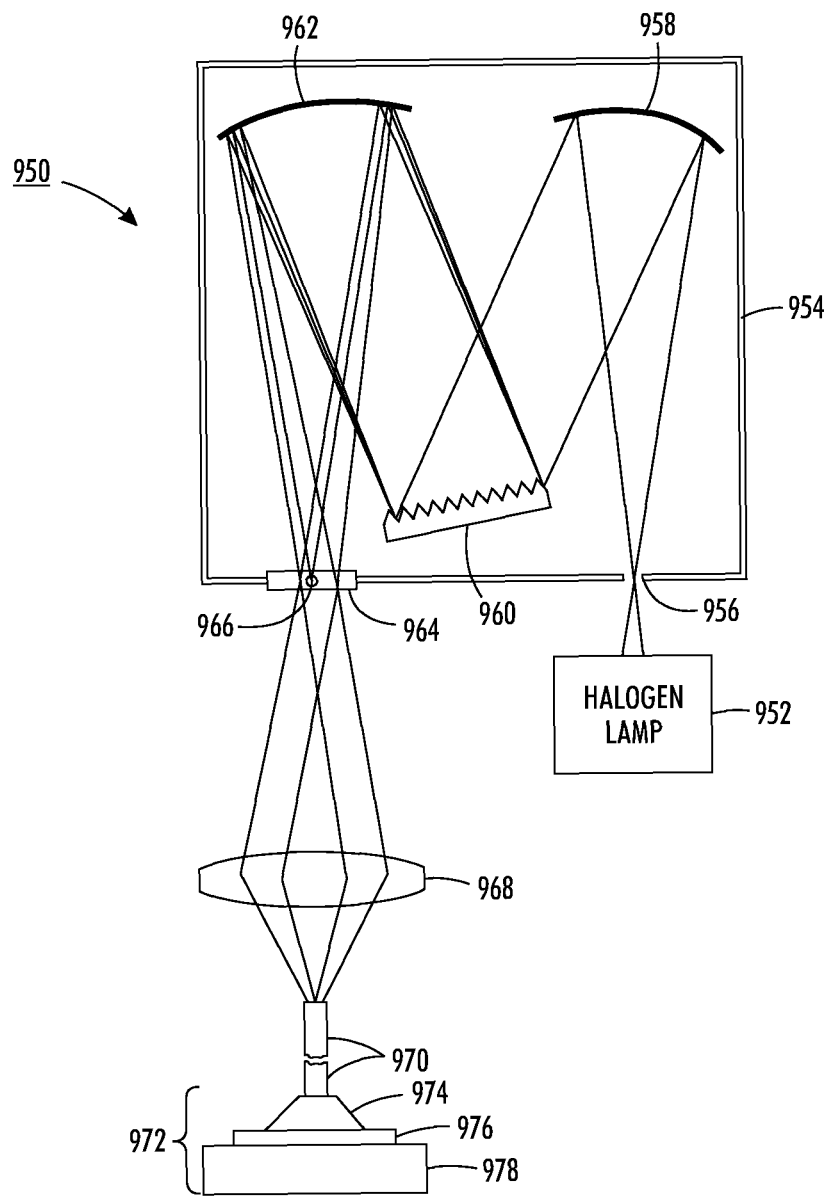
FIG. 40 is a schematic diagram of another test implementation as in FIG. 1 to obtain spectral information about a dark sub-band, e.g. a dark narrow band.

FIG. 40 shows another test implementation in a dark spot detection system 950. System 950 illustratively includes halogen lamp 952, but other suitable light sources that provide appropriate broad band illumination could be used, including, for example, LEDs. Lamp 952 provides light that spans a broad band range of photon energies.

Light from halogen lamp 952 is received by dark sub-band component 954, which, in response, provides input light with a photon energy distribution that also spans a broad band range but also includes a dark sub-band, e.g. a dark narrow band. Light from lamp 952 enters component 954 through slit 956 and is reflected by mirror 958. Mirror 958 has suitable curvature to collimate light from slit 956 and to reflect it onto diffraction grating 960. Grating 960 in turn performs spectral separation and reflects the collimated light from mirror 958 onto mirror 962. Mirror 962 has appropriate curvature to focus the spectrally separated light from grating 960 so that, at aperture 964, light is distributed according to photon energy, i.e., with each position in aperture 964 receiving a respective subrange of photon energies from mirror 962. Wire 966 in aperture 964 therefore blocks one subrange of photon energies from passing through aperture 964, resulting in a dark sub-band in the input light. In the illustrated implementation, wire 966 is movable across aperture 964 under control of a micrometer screw, so that it can be very precisely positioned.

Input light from component 954 is received by lens 968, which causes the light to converge on an end facet of optical fiber 970. Fiber 970 transmits the input light to assembly 972, which could be implemented in a variety of different ways, including several of those described above. In the illustrated implementation, assembly 972 includes propagation component 974, transmission structure 976, and photosensing component 978. Propagation component 974 operates to spread the input light from fiber 970 onto transmission structure 976. Transmission structure 976 has laterally varying transmission properties, so that different subranges of input light received at its entry surface are provided at different positions of its exit surface, as described in relation to exemplary implementations above. Photosensing component 978 can be an IC-implemented photosensor array operated, for example, as a spectrometer, or could be a PSD, providing a differential signal indicating position of a dark spot on its photosensitive surface.

Component 954 in FIG. 40 can be operated to simulate input light similar to that provided by certain other types of light input components, such as various light sources, optical sensors, stimulus-wavelength converters, or even apertures or other optical components through which such input light could be received. For example, a surface Plasmon resonance (SPR) sensor provides input light if illuminated with broad band light at a certain angle, because a thin metallic layer in the SPR sensor absorbs photons in a certain sub-band by creating surface plasmons; the surface plasmon energy depends on refractive index close to the metallic layer's surface. Specific binding events in the vicinity of the metallic layer's surface change surface plasmon energy and therefore also change the narrow dark band reflected by the SPR sensor. More specifically, localized SPR sensors include small metallic nanoparticles in which the surface plasmons are created, rather than being created at the surface of a thin metal film. Various commercially available SPR sensors and localized SPR sensors and other commercially available technology using SPR and localized SPR could be used in a light input component in implementations similar to FIG. 40 or in other implementations.

Figure 41:
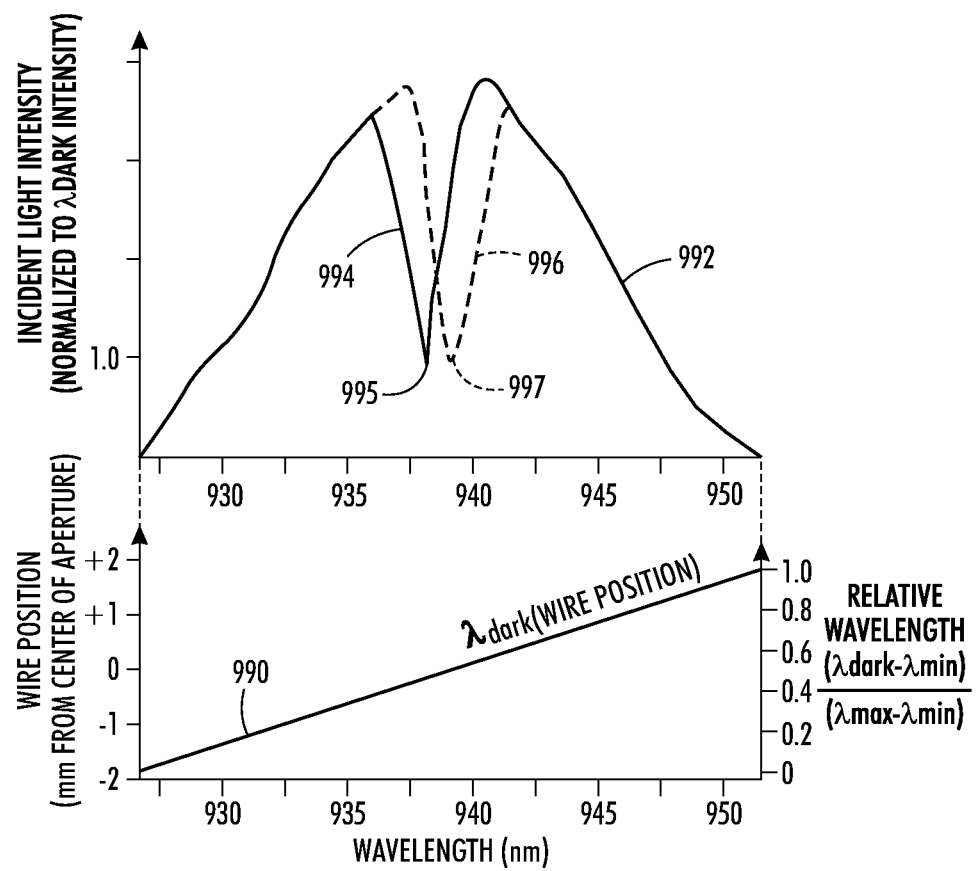
FIG. 41 includes two graphs showing operational features of an experimental implementation as in FIG. 40 across a range of wavelengths.

FIG. 41 illustrates graphically results obtained with an implementation of system 950. In both graphs, the horizontal axis represents wavelength in nanometers.

In the lower graph, the vertical axis at left represents position of wire 966 measured in millimeters from the center of aperture 964, while the vertical axis at right represents relative wavelength of the dark wavelength $\lambda_{dark}$. As shown, the relative wavelength is proportional to the wire position, and can be calculated as the ratio of $(\lambda_{dark}-\lambda_{min})$ to $(\lambda_{max}-\lambda_{min})$, where $\lambda_{min}$ and $\lambda_{max}$ are the wavelengths blocked at the two extreme positions of wire 966. As illustrated by line 990, $\lambda_{dark}$ as a function of wire position is linear with constant slope.

In the upper graph in FIG. 41, the vertical axis is incident light intensity, illustratively normalized to the intensity at $\lambda_{dark}$. Solid line curve 992 represents a first position of wire 966, and includes solid line dip 994, illustrating the subrange of photon energies blocked by wire 966, with the minimum intensity being at position 995. Similarly, dashed line dip 996 illustrates photon energies blocked in a second position of wire 966, with the minimum intensity at position 997. Dips 994 and 996 are merely illustrative, and additional dips could be obtained between them or to the left of dip 994 and the right of dip 996, by adjusting the position of wire 966. Therefore, by appropriate selection and calibration of assembly 972, in accordance with the desired range for sensing dark sub-bands, the photon energy of dark narrow bands and other dark sub-bands can be accurately detected.

In an experimental implementation, the inverse slope of line 990 was 6.3 nm/mm, and the step size between positions of wire 966 was 50 μm; as a result, the difference in wavelength for each step was approximately 315 pm. Based on experimental results, it is believed that photon energies of dark sub-bands may be detected over the whole range required for localized SPR and SPR sensors (from, e.g., 400 nm to 950 nm). By choosing suitable design parameters for a linear variable coating on top of a PSD, spectral shifts of a dark sub-band with a dip having effective width between less than 1 nm and 50 nm can be measured.

Various techniques may be used to improve sensitivity and resolution, such as using an improved position sensor, higher optical intensity, low noise implementation, and a transmission structure in the form of a suitable coating on the position sensor. It may be possible to obtain picometer resolution over a range of 30 nm with readout speed less than 1 millisecond, and with optical fiber 970 mounted directly to the coated position sensor without intervening optics, producing a vibration insensitive, compact device.

Figure 42:
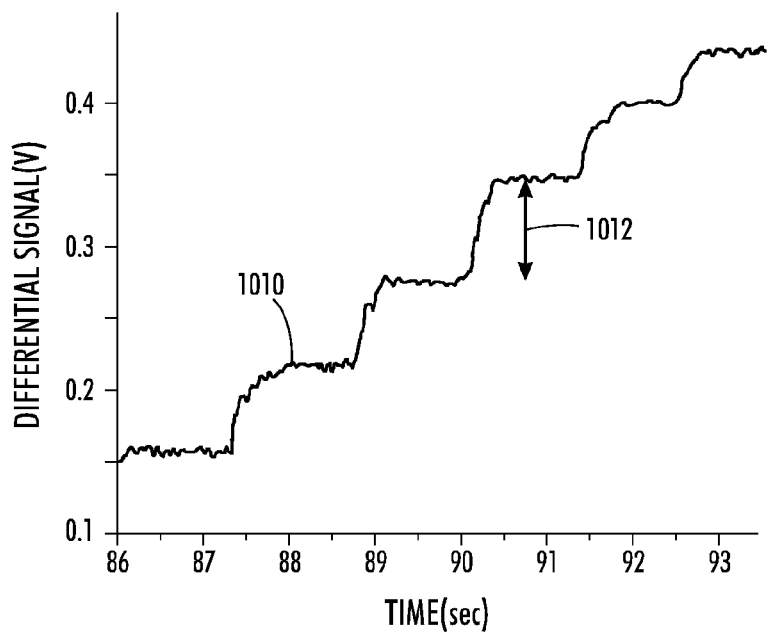
FIG. 42 is a graph showing differential signal as a function of time for an experimental implementation with operational features as in FIG. 41.

The graph in FIG. 42 illustrates experimentally obtained measurements with a setup similar to FIG. 40 using a PSD to obtain a differential signal. As can be seen from the horizontal time scale, wire 966 was moved approximately once per second across a range of six positions, being held for approximately 1 second at each position. Curve 1010 correspondingly includes a series of step-like features, with the vertical part of each step occurring during a respective change of position and the horizontal part of each step occurring while wire 966 is in a stable position. Curve 1010 thus shows how the differential signal changes over time in response to change over time of wire position, another example of an effect due to transmission of light with lateral variation. Each change of position was 50 μm, with the resulting change in wavelength being approximately 315 pm. As shown by line 1012, the difference between positions was approximately 70 mV. In the experimental implementation, noise was less than $0.5 \text{ mV}/(\text{Hz})^{1/2}$; in other words, with time resolution of 1 second, the wavelength shift resolution was less than 2.5 pm, and, in this case, with time resolution of 20 ms, wavelength shift resolution was less than 16 pm. With improved electronics and higher optical input power, sub-pm wavelength resolution with ms time resolution seems feasible. As in other examples above, each step in curve 1010 could be automatically detected by applying an appropriate change criterion, e.g. a slope-based criterion, and each steps time could be identified and used to obtain information about the time of its cause.

Figure 43:
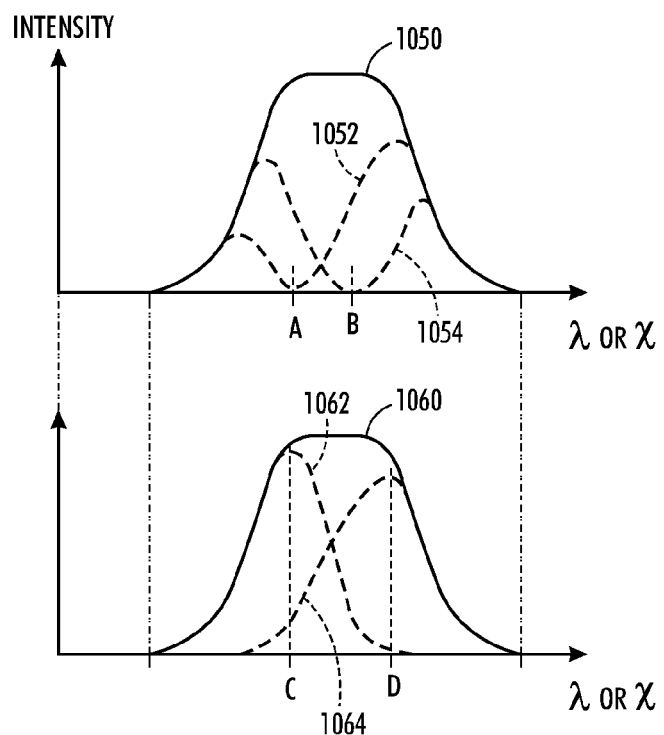
FIG. 43 shows graphs of two intensity functions, one with a dark sub-band and/or dark spot and the other with a light sub-band and/or light spot.

The graphs in FIG. 43 illustrate general examples of sub-bands about which information could be obtained using techniques as described herein. In the upper graph, curve 1050 shows a broad band's light intensity as a function either of wavelength λ (for a spectrum, e.g. of input light) or as a function of position x (for a laterally varying distribution, e.g. after the input light is transmitted with lateral variation); curves 1052 and 1054 similarly show intensity of light that includes dark sub-bands or dark spots, with curve 1052 showing a dark sub-band or dark spot with a minimum at A on the horizontal axis and curve 1054 with a minimum at B. In the lower graph, curve 1060 also shows a broad band's light intensity; curves 1062 and 1064 similarly show intensity of light that includes light sub-bands or light spots, with curve 1062 showing a light sub-band or light spot with a peak at C on the horizontal axis and curve 1064 with a peak at D.

As suggested in FIG. 43, the full width half maximum (FWHM) of each sub-band or spot is less than that of the broad band, but the sub-band's or spot's FWHM could in some applications be much smaller than the broad band's, e.g. where the sub-band is a narrow band, or could be 75% or another proportion that is more than half of the broad band's, e.g. with input light from certain kinds of sensors. In any case, change between A and B in the upper graph or between C and D in the lower graph could occur over time as illustrated, e.g., in FIGS. 33, 37, and 42, and a time at which change occurs could be obtained, such as from change in differential quantity as described above. It is also of interest to note that a dark sub-band or dark spot can, in some implementations, be treated as two separated light sub-bands or light spots, as suggested by the upper graph in FIG. 43. A differential signal from a PSD, however, could be ambiguous: If the lower and upper limits of the broad band correspond with the lateral bounds of a PSD, various dark spot and light spot positions could produce the same differential signal, which will be ambiguous unless it is known whether the spot is dark or light.

Some of the implementations of FIGS. 1-43 illustrate examples of detection systems that include an optical sensor and a detector. The optical sensor outputs one or more sub-bands, e.g. a narrow band, of optical wavelengths when illuminated with a broad band of optical wavelengths. The detector includes at least one layer with laterally varying transmission properties. The detector receives light output by the optical sensor and transmits a portion of the received light at a position of the at least one layer. The detector uses the position to determine wavelength changes in the output from the optical sensor.

In specific implementations, the system can include an optical fiber that receives output light from the optical sensor and guides the light to the detector. Also, the system can include a differential amplifier connected to receive two signals from the detector.

Implementations in FIGS. 1-43 further illustrate examples of apparatus that include a stimulus-wavelength converter that provides light within an energy range that includes first and second peak energy values about which the converter provides light in response to first and second stimulus values, respectively; a transmission structure that is a layered structure with entry and exit surfaces and a laterally varying transmission function; and a propagation component that propagates light from the converter to the transmission structure's entry surface. The transmission structure provides photons at first and second positions of its exit surface in response to light received at its entry surface with the first and second peak energy values, respectively; therefore, a change between the first and second stimulus values changes relative quantities of photons provided at the first and second positions.

Implementations in FIGS. 1-43 similarly illustrate examples of apparatus that include a stimulus-wavelength converter that provides light within a photon energy range, providing light in first and second sub-bands of the range in response to first and second values of a stimulus, respectively; a transmission structure that is a layered structure with entry and exit surfaces; and a propagation component that propagates light from the converter to the transmission structure's entry surface. The transmission structure provides photons at first and second positions of its exit surface in response to light received at its entry surface. The stimulus-wavelength converter, propagation component, and transmission structure are configured so that, due to transmission of light with lateral variation, relative quantities of photons provided at the first and second positions change over time in response to change over time between the first and second sub-bands.

In specific implementations, a system includes the apparatus, and also includes photosensing components and circuitry. The photosensing components sense quantities from the first and second positions of the exit surface. The circuitry compares sensed quantities from the first and second positions, and can include a processor.

Implementations in FIGS. 1-43 further illustrate examples of apparatus that include a transmission structure as described above, a photosensing component that photosenses quantity of photons provided at positions of the exit surface, and circuitry that responds to the photosensed quantities, providing at least one differential quantity as described above. Similarly, the implementations illustrate examples of methods of producing such an apparatus.

In specific implementations, the transmission structure can be a coating over the photosensing component. The circuitry can compare a photosensed quantity with another photosensed quantity or with a calibration quantity of photons. The circuitry can obtain a differential quantity in the ways described above. The circuitry can include a processor. The circuitry can include an IC with a photosensor array, such as with CCD or CMOS readout.

Implementations in FIGS. 1-43 further illustrate examples of detection systems that include an optical sensor and a detector. The optical sensor, when illuminated with a broad band of optical wavelengths, outputs approximately the broad band with a dark sub-band. The detector includes one or more transmissive layers, and the optical sensor and detector are configured so that the detector receives light output by the optical sensor and, due to transmission of light with lateral variation, transmits light in each of a set of wavelengths in the broad band at a respective position of the layers. The detector uses the respective positions to determine wavelength changes of the dark sub-band in the output from the optical sensor.

Implementations in FIGS. 1-43 further illustrate examples of systems that include a light input component and a transmission component. The light input component provides input light spanning a range of photon energies and including one or more dark sub-bands within the range. The transmission component includes one or more layers between entry and exit surfaces. The light input component and the transmission component are configured so that the entry surface receives input light from the light input component and, in response, the transmission component provides output distributions of light at the exit surface. Due to transmission of light with lateral variations, the output distributions include, for each of a set of the dark sub-bands, a respective region within which intensities are measurably lower than in neighboring regions.

In specific implementations, at least one layer, such as of a transmission structure or of transmission layers, has a laterally varying transmission function. In other specific implementations, the configuration is such that a detector or entry surface of a transmission component receives light across a range of incident angles, such as from an optical sensor or from a light input component.

Implementations in FIGS. 1-43 further illustrate examples of using apparatus as described above. For example, a method can photosense quantities of photons provided at first and second positions of a transmission structure's exit surface, and this act of photosensing quantities can be performed over time; such a method can also identify time of change in relative quantities provided at the first and second positions and use the identified time of change, such as to obtain information about time of change between first and second stimulus values.

In general, many additional techniques could be employed in the implementations of FIGS. 1-43, such as adjusting photosensed quantities from subrange cells based on photosensed quantities from reference cells, as described in greater detail in U.S. Pat. No. 7,291,824, incorporated herein by reference. This adjustment could be performed on analog quantities or, after conversion to digital values, on digital quantities.

The implementations in FIGS. 1-43 illustrate various applications of techniques as described above, including readout from stimulus-wavelength converters and other optical sensors; use in a camera or other imaging device; use in temperature measurement; use in readout of a well plate; and use obtaining spectral information about dark narrow bands, such as in light from SPR sensors. Energy information techniques involving laterally varying transmission of light as a function of photon energy, as exemplified by the implementations in FIGS. 1-43, can also be applied in many other applications. A particularly interesting application of optical sensor readout is in automobiles, where optical sensor robustness against EMI is especially valuable. Other applications involve biological, chemical, and environmental sensors. In general, techniques as described above can be used in monitoring, e.g. providing tuning values to light sources such as to obtain stable input light, as described in co-pending U.S. Pat. No. 7,701,490 and incorporated herein by reference in its entirety.

Various of the techniques described above have been successfully implemented or simulated, including the production of a detector that includes a commercially available IC covered with a laterally graded Fabry-Perot cavity filter on a glass slide. Wavelength resolution has been experimentally determined and successfully simulated on a computer. Anti-resonant waveguide techniques have been successfully tested. As described above, temperature measurement has been successfully performed by using a commercially available detector coated with a laterally varying Fabry-Perot coating.

The exemplary implementations described above are advantageous because they can provide compact, inexpensive components to perform functions such as readout of stimulus-wavelength converters or other optical sensors, such as to obtain information about analytes, as described in U.S. Pat. No. 7,433,552, incorporated herein by reference in its entirety. In general, the techniques can be implemented in existing sensors, photosensors, and cameras, including camcorders, digicams, and webcams available in the consumer market. The results of photosensing can be read out and compared rapidly.

Readout implementations as described above can be applied in various applications, several of which are described or mentioned above. Readout implementations as described above can also be applied in smart sensors, in sensors with bus capabilities, and in sensors with self-diagnostic capabilities, with self-calibration, and with self-adaptation. Readout implementations might also have application in relation to analyzers as described in U.S. Pat. Nos. 7,358,476 and 7,479,625, in relation to scanning applications as described in U.S. Pat. No. 7,420,677, and/or in relation to photosensing optical cavity output light as described in U.S. Pat. No. 7,471,299, all incorporated herein by reference in their entireties.

The exemplary implementations described above generally rely on transmission structures that include highly reflective interfaces, so that much of the incident light is reflected and only a small fraction reaches the photosensor array. Therefore, the techniques described above are especially useful in applications in which light intensity is very high or a light source emits through a large area or over an extended time. In addition, the above techniques make it possible to increase sensitivity by choosing very long integration times (without loss of throughput capacity), simpler optics, and no dispersion element. By contrast, some conventional systems such as monochromators lose all light defracted into the $0^{th}$, $2^{nd}$, and higher orders. In the implementations described above, very high light yield can be achieved by combining a transmission structure with a highly sensitive photosensor array, such as one that includes avalanche photodetectors.

In addition, components could have various shapes, dimensions, or other numerical or qualitative characteristics other than those illustrated and described above. For example, in the exemplary implementations described above, cells of a photosensor array photosense in different subranges of an application's photon energy range. The subranges of cells could have any appropriate widths and relationships, and could, for example, overlap or be distinct. The width of a cell's subrange can be chosen by designing the transmission structure and the cell sensing area; for example, the width may be as small as 0.1 nm or as great as tens of nanometers.

Some of the above exemplary implementations involve specific materials, such as in photosensor arrays or position sensors and transmission structures, but the invention could be implemented with a wide variety of materials and with layered structures with various combinations of sublayers. In particular, photosensor arrays for a desired speed, sensitivity and wavelength range could have any suitable material, such as silicon, germanium, indium-gallium-arsenide, gallium arsenide, gallium nitride, or lead sulphide, and could be produced with any appropriate kind of devices, including, for example, photodiodes, avalanche photodiodes, p-i-n diodes, photoconductors, and so forth, with any appropriate technique for sensing and reading out information whether based on CCD, CMOS, or other techniques. Various commercially available detector arrays have pixel densities as high as ten megapixels, and some high density ICs have become relatively inexpensive.

Similarly, transmission structures could be fabricated with any appropriate techniques, including thin film technology such as sputtering, e-beam or thermal evaporation with or without plasma assistance, epitaxial growth, MBE, MOCVD, and so forth. To produce Bragg mirrors, appropriate pairs of materials with low absorption coefficients and large difference in refractive indices could be chosen, bearing in mind the photon energies of interest; exemplary materials include $SiO_2/TiO_2$, $SiO_2/Ta_2O_5$, GaAs/AlAs, and GaAs/AlGaAs. Thicknesses of layer in transmission structures may vary from 30 nm up to a few hundred nanometers.

Some of the above exemplary implementations involve particular types of transmission structures, such as Bragg mirrors and paired distributed Bragg reflectors separated by a Fabry-Perot cavity, but these transmission structures are merely exemplary, and any transmission structure that has laterally varying optical thickness could be used. Various techniques could be used to produce transmission structures with lateral variation in addition to those described above, including, during deposition, tilting the substrate, using a shadow mask, or using a temperature gradient to obtain graded layer thickness; also, during homogeneous deposition, off-axis doping, such as by e-beam, MBE, or MOVPE, could produce lateral variation.

Some of the above exemplary implementations employ enhanced light-target interaction to obtain fluorescence. In general, however, the techniques described above could also be used for light from self-emitting or auto-fluorescing objects such as particles. Furthermore, various types of fluorescence, photo-luminescence, chemo-fluorescence, inelastic scattering, and so forth could be employed. The technique of anti-resonant waveguiding, described above, is only one of many techniques that could be used for enhanced light-target interaction, and any such excitation technique could be applied continuously or intermittently along a path. Various parameters could be adjusted to obtain anti-resonant waveguiding, including the shape of quartz or glass surrounding the channel; a thinner structure is generally better, with a surface parallel to the channel generally being required.

Additional description of excitation techniques is found in U.S. Pat. No. 7,386,199, incorporated herein by reference in its entirety.

Some of the above exemplary implementations use specific stimulus-wavelength converters or other optical sensors or specific propagation components to obtain light with desired characteristics, but various other converting or sensing techniques and propagation components could be used within the scope of the invention, and, as shown in some exemplary implementations, a light input component might not include a converter, a sensor, or a propagation component. Exemplary implementations of propagation techniques that include spreading are described in U.S. Pat. No. 7,315,667, incorporated herein by reference in its entirety.

The exemplary implementation in FIG. 29 employs a CPU, which could be a microprocessor or any other appropriate component. Furthermore, as noted above, the adjustment of photosensed quantities could be done either digitally or with analog signals, and could be done either on the same IC as the photosensor array, on other components, or on a combination of the two, with any appropriate combination of software or hardware.

The above exemplary implementations generally involve production and use of ICs, transmission structures, light input techniques, propagation components, and readout and comparing circuitry following particular operations, but different operations could be performed, the order of the operations could be modified, and additional operations could be added within the scope of the invention. For example, in implementations in which a transmission structure is on a separate substrate from a photosensor array, the transmission structure could be moved relative to the photosensor array between consecutive sensing operations. Also, readout of adjusted or unadjusted sensed quantities from an IC could be performed serially or in parallel, and could be performed cell-by-cell or in a streaming operation.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. Apparatus comprising:
   a transmission structure with entry and exit surfaces, the transmission structure being a layered structure with a laterally varying energy transmission function; in response to light received at the entry surface that has distributions across a range of photon energies, the transmission structure providing output photons at positions of the exit surface;
   a photosensing component that photosenses quantities of photons provided at positions of the exit surface; and
   circuitry that responds to the photosensed quantities by providing at least one differential quantity that compares photosensed quantities from the same one of the distributions.

2. The apparatus of claim 1 in which the transmission structure includes at least one of:
   a coating on the photosensing component;
   a coating on a support structure over the photosensing component;
   a wedge-shaped transmission cavity between reflective films;
   a staircase-shaped transmission cavity between reflective films;
   a laterally graded Bragg mirror with laterally graded layers;
   a layer with two-dimensional variation in optical thickness;
   a layer with laterally varying thickness; and
   a layer with laterally varying refractive index.

3. The apparatus of claim 1 in which the photosensing component includes at least one of:
   a photosensor array with CCO readout;
   a photosensor array with CMOS readout;
   a one-dimensional photosensor array;
   a two-dimensional photosensor array;
   one or more discrete photosensing devices;
   one or more avalanche photodiodes;
   one or more photomultiplier tubes; and
   a position-sensitive detector.

4. The apparatus of claim 1 in which the circuitry includes at least one of:
   a differential amplifier;
   circuitry that provides a differential signal; and
   circuitry that obtains information about times of wavelength change.

* * * * *